(12) United States Patent
Rothenberg et al.

(10) Patent No.: US 6,707,967 B2
(45) Date of Patent: Mar. 16, 2004

(54) EFFICIENT SAMPLED BRAGG GRATINGS FOR WDM APPLICATIONS

(75) Inventors: Joshua E. Rothenberg, San Jose, CA (US); Hongpu Li, Fremont, CA (US); Yao Li, Fremont, CA (US); Jason Zweiback, Fremont, CA (US); Jan Popelek, Fremont, CA (US)

(73) Assignee: Teraxion Inc., Quebec (CA)

( * ) Notice: Subject to any disclaimer, the term of this patent is extended or adjusted under 35 U.S.C. 154(b) by 173 days.

(21) Appl. No.: 09/757,386

(22) Filed: Jan. 8, 2001

(65) Prior Publication Data

US 2003/0086646 A1 May 8, 2003

Related U.S. Application Data

(60) Provisional application No. 60/234,318, filed on Sep. 20, 2000, provisional application No. 60/235,873, filed on Sep. 27, 2000, provisional application No. 60/241,594, filed on Oct. 18, 2000, and provisional application No. 60/243,423, filed on Oct. 25, 2000.

(51) Int. Cl.[7] .................................................. G02B 6/34
(52) U.S. Cl. ......................... 385/37; 385/24; 359/130; 359/900
(58) Field of Search ................................ 359/900, 130; 385/37, 24

(56) References Cited

U.S. PATENT DOCUMENTS

| | | | | |
|---|---|---|---|---|
| 5,945,261 A | * | 8/1999 | Rourke | 385/37 |
| 5,982,963 A | | 11/1999 | Feng et al. | |
| 6,067,391 A | * | 5/2000 | Land | 385/27 |
| 6,081,640 A | | 6/2000 | Ouellette et al. | |
| 6,415,081 B1 | * | 7/2002 | Levner et al. | 359/130 |
| 2002/0191912 A1 | * | 12/2002 | Robinson et al. | 385/37 |

FOREIGN PATENT DOCUMENTS

| | | |
|---|---|---|
| WO | WO 99/22255 | 5/1999 |
| WO | WO 99/31537 | 6/1999 |
| WO | WO 01/11401 A1 | 2/2001 |

OTHER PUBLICATIONS

Morten Ibsen, et al., "Chirped Moire Fiber Gratings Operating on Two–Wavelength Channels for Use as Dual–Channel Dispersion Compensators", IEEE Photonics Technology Letters, vol. 10, No. 1, Jan. 1998, pp. 84–86.

F. Ouellette, et al., "Broadband and WDM dispersion compensation using chirped sampled fibre Bragg gratings", Electronics Letters, May $25^{th}$ 1995, vol. 31, No. 11, pp. 899–901.

W. H. Loh, et al., "Sampled Fiber Grating Based–Dispersion Slope Compensator", IEEE Photonics Technology Letters, vol. 11, No. 10, Oct. 1999, pp. 1280–1282.

Morten Ibsen, et al., "Sinc–Sampled Fiber Bragg Gratings for Identical Multiple Wavelength Operation", IEEE Photonics Technology Letters, vol. 10, No. 6, Jun. 1998, pp. 842–844.

Dixit, S.N. et al, "Designing Fully Continuous Phase Screens for Tailoring Focal–plane Irradiance Profiles," Optics Letters, vol. 21, No. 21, (Nov. 1, 1996), pp. 1715–1717.

(List continued on next page.)

Primary Examiner—Hemang N. Sanghavi
(74) Attorney, Agent, or Firm—Fulbright & Jaworski, L.L.P.

(57) ABSTRACT

Techniques for designing efficient gratings with multiple frequency response channels based on sampled patterns based predominantly on phase modulation of the underlying grating structure. Each period of the phase sampled patterns may include contiguous, discrete phase segments with different phase values, or alternatively, a continuous spatial phase pattern that changes the phase of the underlying grating structure. Moderate amplitude modulation of the underlying grating structure by the sampling structure may also be used together with phase modulation. The grating period or the sampling period may be chirped.

52 Claims, 18 Drawing Sheets

OTHER PUBLICATIONS

Gerchberg, R.W. et al. "A Practical Algorithm for the Determination of Phase from Image and Diffraction Plane Pictures," Optik, vol. 35, No. 2, (1972), pp. 237–246.

PCT Search Report dated Jun. 5, 2003 for PCT/US01/29233.

Averutsky I A et al., "Design of Widely Tunable Semiconductor Lasers and Concept of Binary Superimposed Gratings (BSG's S)," IEEE Journal of Quantam Electronics, IEEE Inc., New York, US, vol. 34, No. 4, pp. 729–741, Apr. 1, 1998.

Gerchburg, R.W., "Super–Resolution Through Error Energy Reduction," Optica ACTA, vol. 21, No. 9, pp. 709–720, Sep. 1, 1974.

Gerchberg R.W. et al., "A Practical Algorithm for the Determination of Phase From Image and Diffraction Plane pictures," Optik, Wissenschaftliche Verlag GmbH, Stuttgart, DE, vol. 35, No. 2, pp. 237–246, 1972.

* cited by examiner

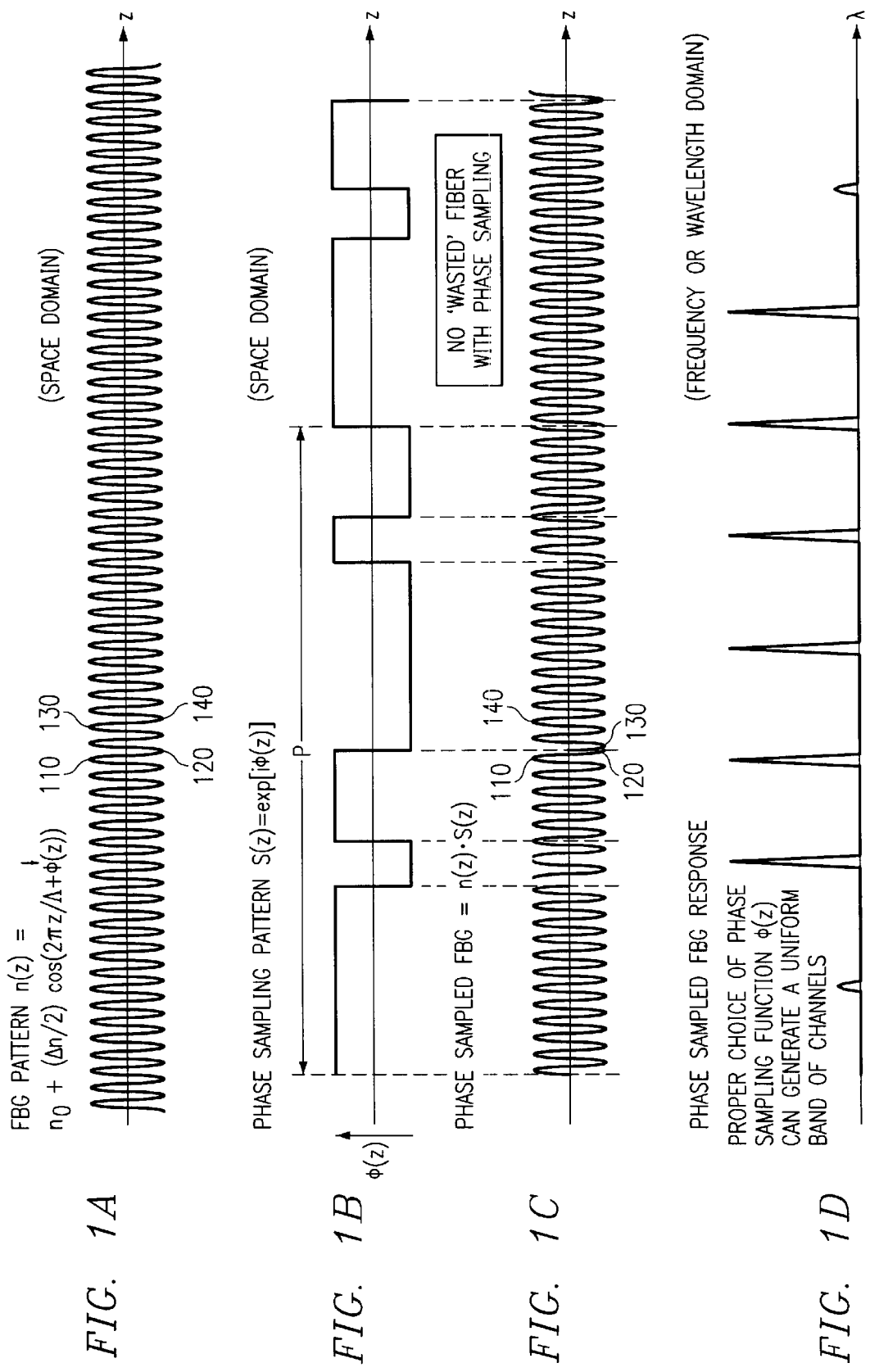

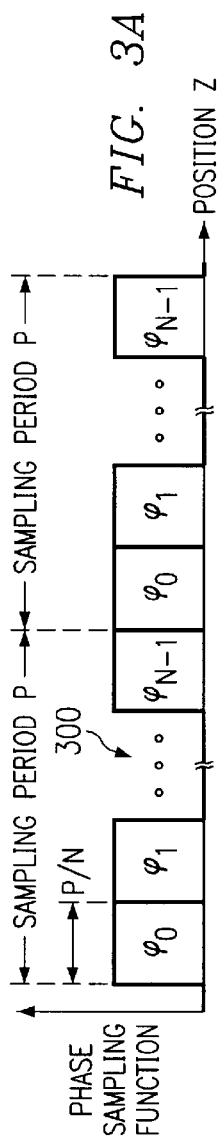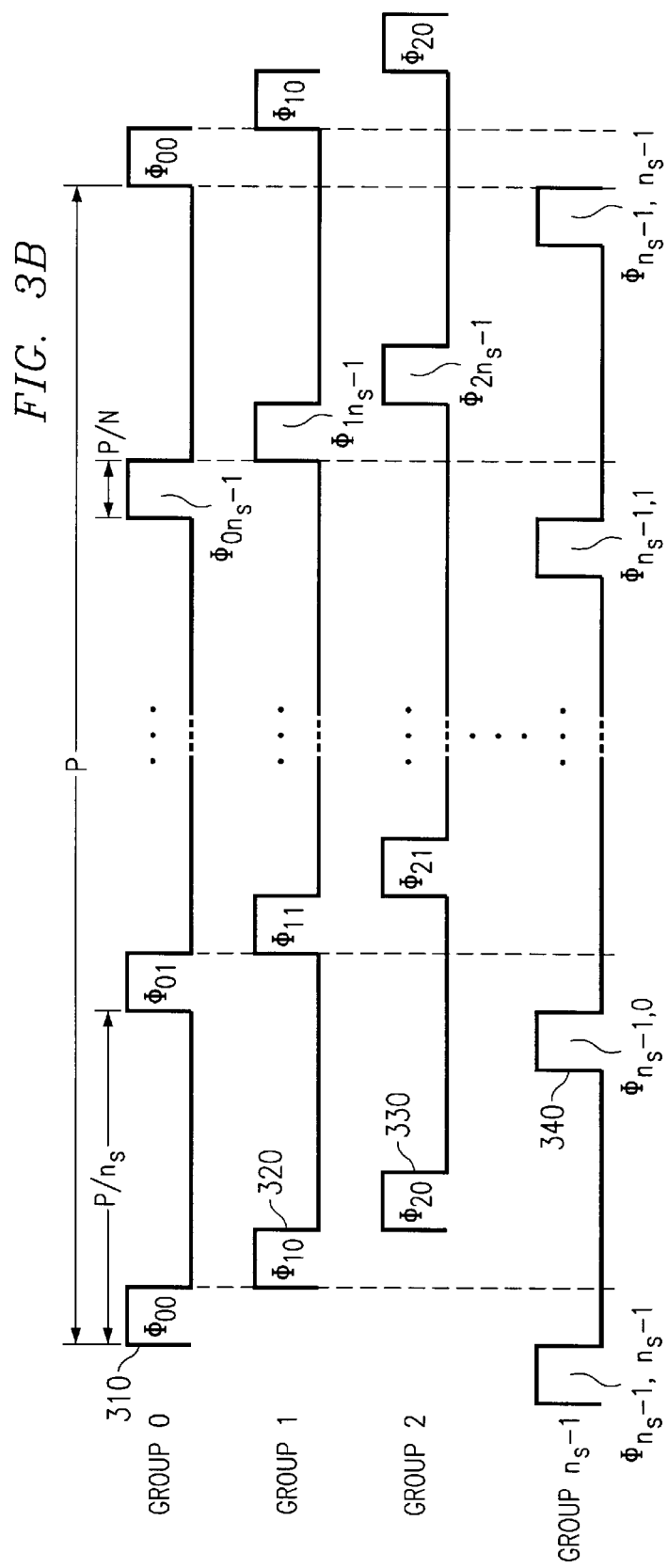

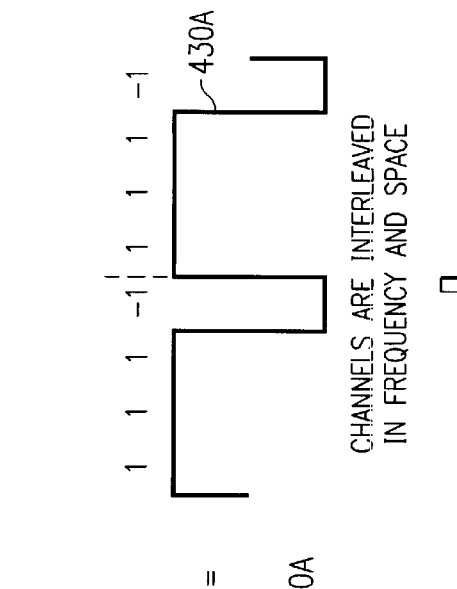
FIG. 4A — $k=0$, SIMPLE AMPLITUDE SAMPLING
FIG. 4B — $k=1$, AMPLITUDE SAMPLING WITH $\pi$ PHASE SHIFT
FIG. 4C — CHANNELS ARE INTERLEAVED IN FREQUENCY AND SPACE
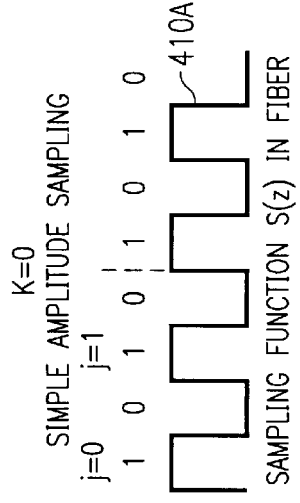
FIG. 4D — 'TWO' CHANNELS ($n_s=2$)
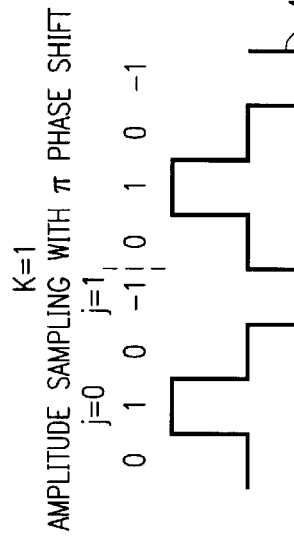
FIG. 4E — THE $\pi$ PHASE SHIFT LEADS TO A FREQUENCY SHIFT OF ONE-HALF OF A CHANNEL, 'TWO' CHANNELS ($n_s=2$)
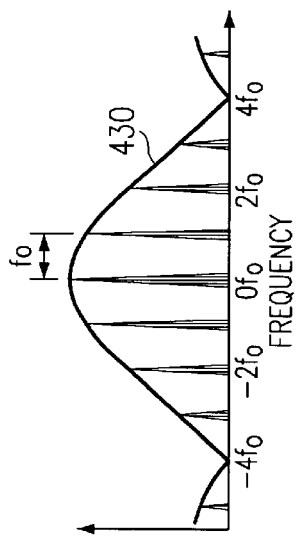
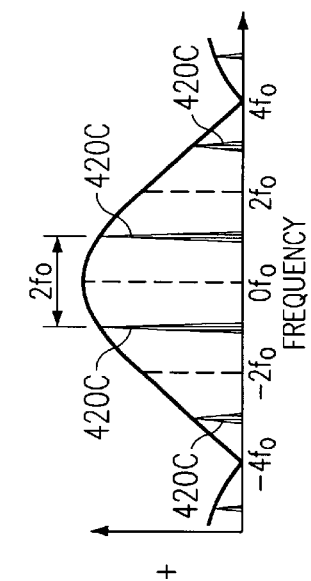
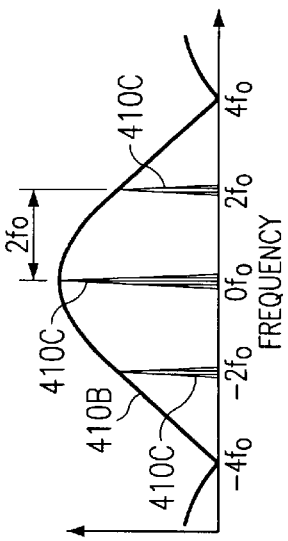
FIG. 4F — 'FOUR' CHANNELS ($N=n_s^2=4$)

FOURIER ANALYSIS OF THE BINARY PHASE-ONLY GRATING

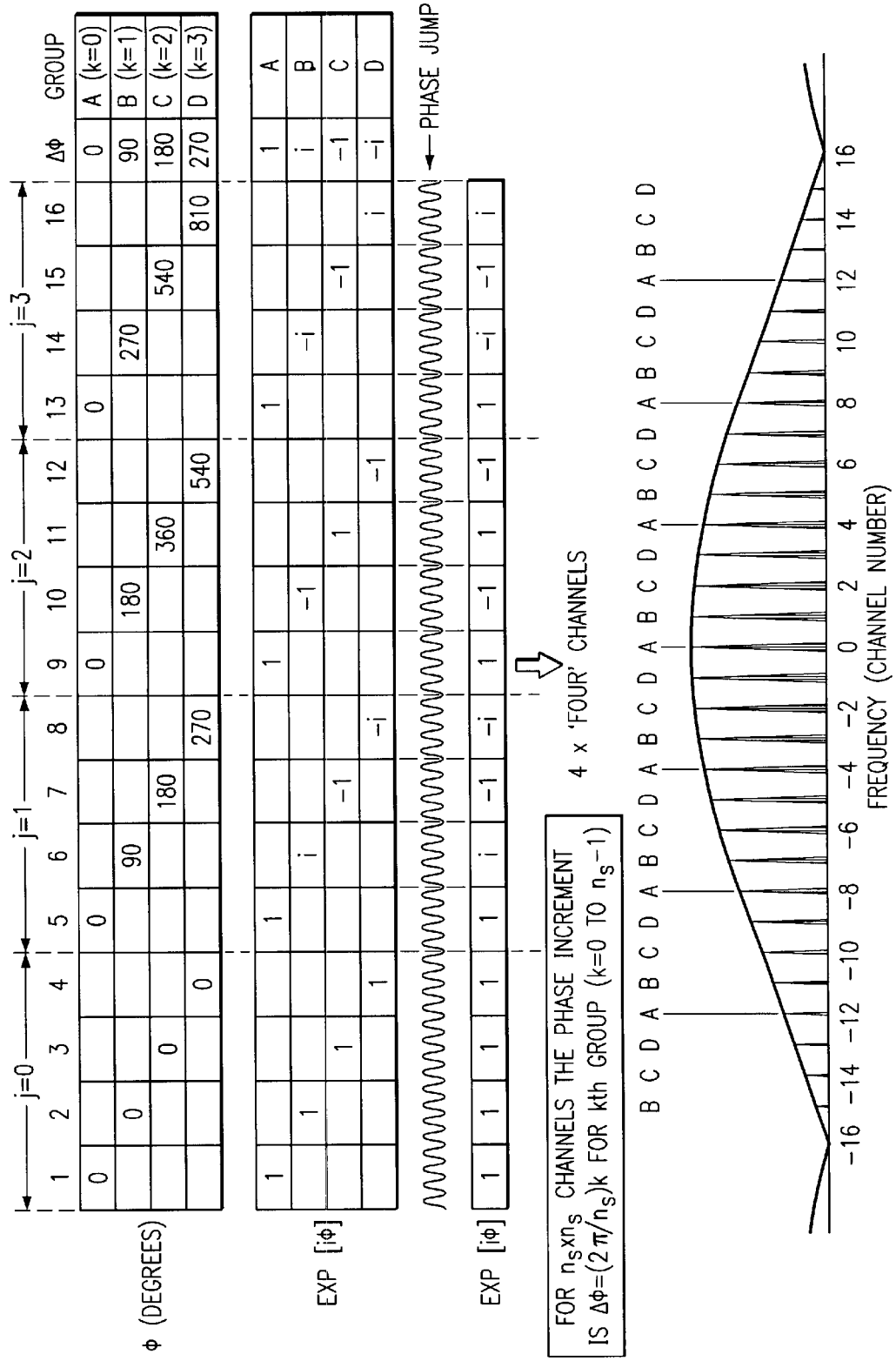

FIG. 6A

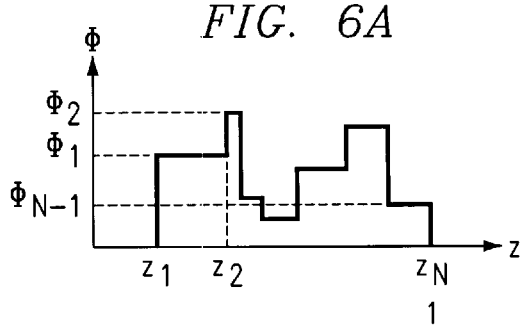

FIG. 6B

LET $f(z) = \sum_{-M}^{M} [I_m(z) - \alpha I]^2$ BE THE ERROR FUNCTION TO MINIMIZE 610 — INITIAL z (z1, z2,...., $Z_N$)

620 — NEW z' ARE GENERATED AROUND THE CURRENT POINT APPLYING RANDOM MOVE $P(\Delta f) = \exp(-\Delta f / T_0)$
$\Delta f = f(z') - f(z)$ 630 — IF $\Delta f \leq 0$, THE NEW POINT WILL BE ACCEPTED, OTHERWISE THE POINT WILL BE ACCEPTED WITH PROBABILITY P

640 — NUMBER ITERATIONS $> N_S$? NO

YES

650 — REDUCE THE TEMPERATURE T RESET NUMBER TO 0, SET CURRENT POINT TO THE OPTIMUM

660 — STOPPING CRITERION SATISFIED? NO

YES

670 — END

SLOW CAREFUL COOLING WILL BRING THE MATERIAL TO A HIGH ORDER AND THE LOWEST ENERGY. SO IT IS CALLLED SIMULATED ANNEALING ALGORITHM.

EFFICIENT SAMPLED BRAGG GRATINGS FOR WDM APPLICATIONS

CROSS-REFERENCE TO RELATED APPLICATIONS

This application claims the benefits of U.S. Provisional Application No. 60/234,318, filed Sep. 20, 2000, No. 60/235,873, filed Sep. 27, 2000, No. 60/241,594, filed Oct. 18, 2000, and No. 60/243,423, filed Oct. 25, 2000.

BACKGROUND

This application relates to optical gratings, and more particularly, to sampled optical fiber Bragg gratings (FBGs) for optical wavelength-division multiplexed (WDM) devices and systems.

Optical gratings may be formed in optical conduits such as waveguides and fibers by making spatial periodic structures in the optical conduits along the direction of light propagation. Assuming such an optical conduit has an index of refraction, n, and the periodic structure has a spatial pattern with a spatial period $\Lambda$, an optical wave may be reflected by interacting with this periodic structure when a Bragg phase-matching condition of $\lambda=2n\Lambda$ is satisfied, where $\lambda$ is the wavelength of a reflected optical wave. Optical waves that fail to satisfy the Bragg condition do not efficiently interact with the periodic structure to produce reflected signals. Thus, these optical waves essentially transmit through the grating.

Such a grating may have a constant grating parameter $n\Lambda$ to produce only a single Bragg reflection at a wavelength of $\lambda=2n\Lambda$. Alternatively, the grating parameter $n\Lambda$ may vary, i.e., "chirp", with a position z along the optic axis of a waveguide or fiber so that different spectral components at different wavelengths may be reflected at different positions to experience different delays. This chirped grating can be used for a number of applications, including dispersion compensation in fiber systems.

A second periodic sampling structure may be further included in the grating to superimpose over the above underlying grating structure. This second sampling structure may have a sampling period greater than that of the underlying grating. One effect of this second sampling structure in the spatial domain is to produce a series of discrete reflection channels centered at different wavelengths in the frequency domain, e.g., at the specified wavelengths for WDM applications as defined by the Internal Telecommunications Union (ITU). The reflection channels essentially correspond to different discrete terms in the Fourier transform of the spatial sampling structure.

SUMMARY

One embodiment of a sampled grating of this disclosure includes a wave-guiding conduit to transport optical energy along an optic axis, a grating structure formed in the wave-guiding conduit, and a sampling structure formed in the wave-guiding conduit to superimpose a phase sampling pattern over the grating structure. The grating structure is designed to vary spatially with a grating period along the optic axis to reflect an optical spectral component in the optical energy that satisfies a Bragg phase-matching condition.

The phase sampling pattern has a sampling period greater than the grating period. The sampling period may be a constant or may vary spatially along the direction of the grating. Each period of the phase sampling pattern includes a plurality of contiguous, discrete spatial phase segments along the optic axis. The grating structure changes a phase between at least two adjacent phase segments. Within each phase segment, the grating structure does not change phase.

Alternatively, each period of the phase sampling pattern may be designed to continuously change the phase of the grating structure.

BRIEF DESCRIPTION OF THE DRAWINGS

FIGS. 1A, 1B, 1C, and 1D illustrate a phase sampling pattern formed over a Bragg grating structure according to one embodiment.

FIG. 3A shows one embodiment of a phase sampling pattern with contiguous, discrete phase segments in each spatial sampling period without gaps.

FIG. 3B illustrates one method of achieving the phase sampling pattern in FIG. 3A by spatially interleaving sampling patterns that modulate both phase and amplitude of the underlying grating structure.

FIGS. 4A, 4B, 4C, 4D, 4E, and 4F illustrate the design and operation of one exemplary phase sampling pattern based on the design in FIG. 3A, where "1" and "−1" represent segments that do not change the amplitude of the underlying grating, and "0" represents segments that the amplitude of the underlying grating is zero (i.e., grating voids).

FIG. 5 shows another example of the phase sampling pattern in FIG. 3A.

FIG. 6A shows an alternative design with contiguous, discrete phase segments of varying segment lengths.

FIG. 6B shows one exemplary iteration process for selecting design parameters in designing a phase sampling pattern according to the design in FIG. 6A.

DETAILED DESCRIPTION OF THE INVENTION

Figure 2A:
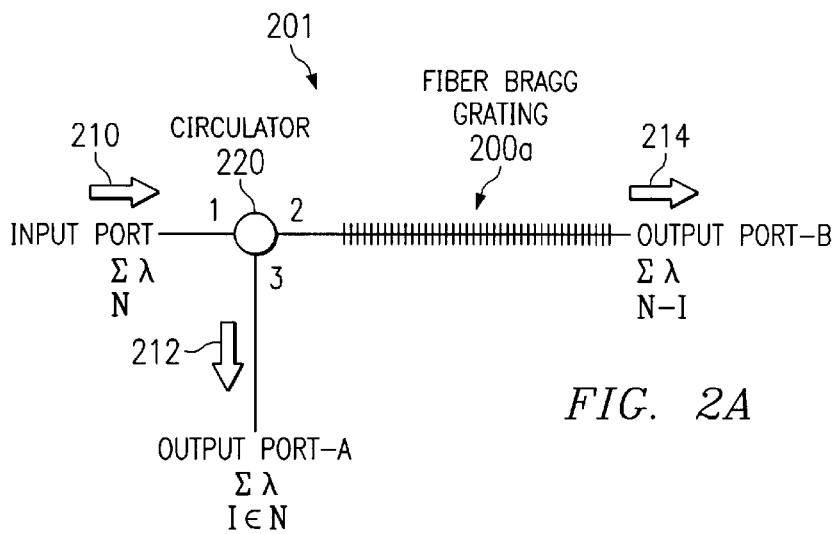
FIGS. 2A, 2B, and 2C show three exemplary applications based on sampled Bragg fiber gratings.

1. Phase Sampling to Maintain Contiguous Grating Structure

The techniques of the present disclosure include spatial sampling patterns primarily based on periodic phase modulations superimposed over contiguous grating structures formed in optical wave-guiding conduits such as optical waveguides formed on substrates or optic fibers. A grating structure has a contiguous presence, without spatial gaps or voids, throughout the entire grating region in the wave-guiding conduit where the sampled grating structure is formed. Hence, essentially all locations in the grating region can interact with input light when the Bragg conditions are met locally.

Such sampling structures may be used to achieve a number of advantages, including but not limited to efficient filtering of input light for a specified given length of the grating structure in a waveguide or fiber, and substantially relaxed requirements of a high index modulation in fabrication of the grating structure based on the index modulation. For example, the underlying grating structure may be formed by a spatial modulation of the amplitude of the refractive index of the fiber core in a fiber. When a sampling pattern, also based on amplitude modulation of the refractive index, produces periodic voids or regions of significantly reduced amplitude in the underlying grating structure to produce $N_{channel}$ number of reflected channels at different wavelengths, the effective length of the fiber and the grating strength used for light filtering by the underlying grating structure is reduced by a factor of $N_{channel}$. This is because the voids do not interact with light to produce Bragg reflections and little light filtering occurs in the voids or low amplitude regions. Excluding the voids and low amplitude regions, the total useful length of the regions in the underlying fiber grating structure for producing Bragg reflections is only a fraction of about ($1/N_{channel}$) of the full fiber grating length. As a result, the transmission opacity measured in dB, is reduced by a factor of $N^2_{channel}$. To obtain a certain level of reflectivity or transmission opacity in a given length of fiber for this type of sampled gratings, it may be necessary to compensate such loss by increasing the amplitude in the modulation in the refractive index. Such increase in the index modulation may be subject to practical limitations, and thus an alternative sampling technique may be desirable.

The present phase sampling techniques, however, can be designed to substantially avoid generation of voids in the underlying grating structure so that the underlying grating structure is essentially contiguous throughout the sampled grating. This can mitigate the above factor for reducing optical efficiency of the sampled gratings from a value of $N^2_{channel}$ to $N_{channel}$, and hence effectively increase the transmissive opacity of the grating, measured in dB, by a factor of $N_{channel}$. In comparison with the above amplitude sampling, this is equivalent to a reduction in the effective index modulation by $(N_{channel})^{1/2}$ while maintaining the same level of grating transmission or reflectivity.

The sampling structures according to the above phase sampling techniques may be formed by pure spatial phase structures that essentially do not modulate the grating strength of the underlying grating structure. In this approach, a pure spatial phase structure may have repetitive patterns of a spatial sequence of distinctive, discrete phase segments with varying phase values along the optic axis of the waveguide or fiber. Within each phase segment, the phase value assigned to the segment remains constant and the spatial pattern of the underlying grating structure does not undergo a phase shift. At a boundary between two adjacent phase segments where a phase is changed, the spatial pattern of the underlying grating structure is phase shifted by the difference between the phase values of those two adjacent phase segments. If two adjacent phase segments have the same phase value, the spatial pattern of the underlying grating structure continues without a phase change across their boundary.

The present sampling structures may also be formed by combining a predominant phase modulation pattern and a moderate amplitude modulation pattern to sample the underlying grating structure. The predominant phase modulation pattern may be configured to generate the desired number of discrete reflection channels centered at selective, different wavelengths within a signal spectral band. The moderate amplitude modulation may be designed to perturb the amplitude modulation by the underlying grating structure and to primarily assist the predominant phase modulation pattern to substantially reduce reflective signals outside the desired signal spectral band. The spatial pattern of the moderate amplitude modulation may be specially designed to substantially eliminate voids and the low-amplitude regions that can significantly reduce the effective length of the grating for light filtering. The predominant phase modulation pattern may have a substantially contiguous, smooth phase changing pattern that periodically repeats along the optic axis of the waveguide or fiber over the sampling region. In addition, the moderate amplitude modulation may also be adjusted to reduce the out-of-band signals in the frequency domain.

FIGS. 1A, 1B, and 1C illustrate the general structure of a sampled grating of an embodiment, where the sampling is predominantly based on phase modulation to allow contiguous presence of the underlying grating structure. FIG. 1A shows the spatial pattern for the grating in the form of a spatial modulation of the refractive index along the fiber. The grating parameter nΛ may be constant in the space domain or may be spatially chirped to have a position dependence. This position dependence may be either linear or nonlinear. A nonlinearly-chirped grating may be used to provide tunable dispersion compensation and pulse shaping in various optical systems, including optical WDM communication systems. This may be done by controlling the nonlinearly-chirped grating parameter nΛ to cause different amounts of relative delays in different reflected spectral components at different settings of the grating. For example, a nonlinearly-chirped fiber grating may be stretched so that the grating parameter at each position of the fiber changes with the change of the fiber length to provide such tunability in dispersion compensation. See, e.g., U.S. Pat. No. 5,982, 963 to Feng et al.

FIG. 1B shows an exemplary phase sampling structure in the space domain according to a further embodiment. The phase of the spatial pattern of the underlying grating structure changes periodically with a spatial period P. Within each period P, the phase may vary at discrete phase values as illustrated or continuously according to a spatial phase pattern. FIG. 1C shows the final phase sampled grating structure wherein the spatial grating pattern still exists throughout the structure but the phase of the spatial pattern of the grating is changed at each phase changing location in the phase sampling pattern of FIG. 1B. This type of discrete phase shifting may be more amenable than that of FIG. 1A to fabrication through, for example, the phase mask illumination method. The phase mask may be fabricated using standard lithography tools which use digital pixellation and thus can be readily used to incorporate discrete phase shifts by the addition of extra pixels at the appropriate locations.

For example, assume the underlying grating structure is formed by a periodic modulation at a constant spatial period $\Lambda$ in the refractive index in the fiber core: $n=n_0[n_{avg}]+(\Delta n/2)\cos[2\pi z/\Lambda+\psi(z)]$, where $n_0[n_{avg}]$ is the average index of refraction in the fiber core and $\psi(z)$ is the phase of the index fringes. The phase sampling pattern in FIG. 1B, hence, may periodically interrupt the phase $\psi(z)$ to cause an overall phase shift between periodic index fringes located in phase segments of different phase values as illustrated in FIG. 1C. The relative phase of the index fringes between the interruptions, however, remains the same. For example, locations 110 and 120 in the fiber core are in the same phase segment and hence their relative phase remains as $\pi$ in the presence of the phase sampling. Similarly, both locations 130 and 140 are in another adjacent phase segment and their relative phase of $3\pi$ is not changed by the phase sampling. Since locations 120 and 130 are respectively in two adjacent phase segments with a phase change of $\pi$, the relative phase between the locations 120 and 130 is changed from $\pi$ in the absence of the phase sampling as shown in FIG. 1A to $2\pi$ due to the phase sampling as shown in FIG. 1C.

In this example, the sampling pattern is purely in the phase, such that the amplitude of the index modulation is not changed by the sampling pattern. Alternatively, a slight or moderate amplitude modulation may be included in the sampling pattern to modify the amplitude pattern in the underlying index pattern n(z). It is desirable that such an amplitude sampling pattern does not leave any substantial regions along the fiber where there is little or no index variation.

FIG. 1D illustrates multiple reflection channels in the frequency (or equivalently the wavelength) domain produced by the phase sampled grating shown in FIG. 1C. The channels are generally evenly spaced in the frequency domain. For WDM applications, the channels are matched to the ITU WDM wavelengths. Generally, it is desirable to keep the amplitudes of different channels substantially the same to reduce signal distortion. However, in some applications it may be needed to design a specific variation or pattern in the channel amplitudes. Phase sampling patterns, when properly designed, may be used to achieve these results as illustrated in the following examples.

2. Exemplary WDM Applications

Various devices and systems may be constructed based on the above sampled gratings. FIG. 2A shows a sampled grating filtering device 201 that filters an input with multiple WDM channels 210 to separate the reflected WDM channels 212 from the transmitted WDM channels 214 that do not satisfy Bragg phase matching conditions. This filtering device 201 may be used as a building block for a number of WDM devices, including but not limited to, WDM filters, multiplexers, and attenuators.

The filtering device 201 includes a sampled fiber grating 200a with a phase sampling pattern based on the present disclosure. An optical circulator 220 is coupled with its port 2 connected to a proximal terminal of fiber grating 200a to direct input 210 through port 1 into grating 200a and the reflected output 212 to port 3, both through port 2. Ports 1 and 3 may be coupled to single-mode fibers for delivering respectively input and reflected output signals 210 and 212. The distal terminal of fiber grating 200a is used as another output port to send out transmitted output signal 214.

Fiber grating 200a may be designed to achieve various operations in filtering the multiple input channels in input signal 210. For example, fiber grating 200a may be designed to reflect alternate wavelength channels, i.e. either odd or even numbered wavelength channels of consecutively numbered input wavelength channels with constant frequency spacing. Filtering device 201 hence can be used for optical DWDM wavelength interleaving. In another specific configuration, FBG 200a may be designed to reflect a consecutive set of wavelength channels chosen to be at the beginning, the ending, or the middle spectral portion of the input wavelength set N in the input signal 210. FBG 200a may also be designed to reflect a specific pattern of channels, including but not limited to reflection of all consecutive channels within a given band except for one or more selected channels.

Furthermore, when the FBG is designed to have a chirped frequency in either configuration, the intended DWDM deinterleaving or filtering operation also incorporates a dispersion compensation functionality. In that case, either positive dispersion or negative dispersion can be designed.

Figure 2B:
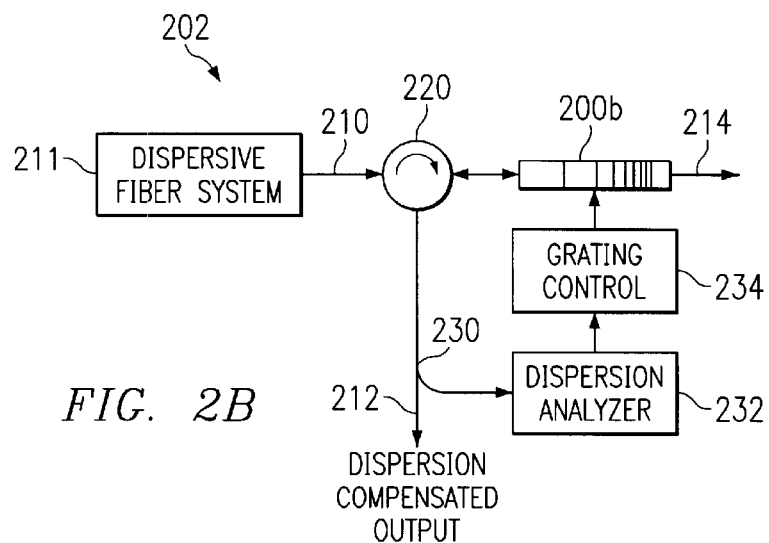

FIG. 2B shows an example of such a device 202. This a tunable WDM dispersion compensation device in which the sampled grating 200b is formed from sampling a nonlinearly-chirped grating structure by using the present sampling techniques. Input port 1 of circulator 220 is coupled to receive input signal 210 of multiple WDM channels from a fiber system 211, which may cause dispersion in input signal 210. An optical coupler or a beam splitter 230 is used to tap a small fraction of reflected signal 212 with multiple channels for dispersion measurements in a dispersion analyzer 232. Dispersion analyzer 232 measures the dispersion in the reflected channels and produces a dispersion indicator. A grating control 234 is coupled to control the nonlinearly-chirped grating parameter $n\Lambda$ of FBG 200b as a function of the position z and is operable to control the grating parameter $n\Lambda$ according to the dispersion indicator from dispersion analyzer 232. As the dispersion in the input signal 210 varies, device 202 can respond to the changing dispersion in fiber system 211 by dynamically adjusting nonlinearly-chirped sampled FBG 200b accordingly to change the amount of dispersion compensation for each reflected WDM channel.

A number of implementations of grating control 234 are described in U.S. Pat. No. 5,982,963 to Feng et al. When sampled FBG 200b is formed in a fiber, for example, grating control 234 may include a fiber stretcher engaged to the fiber and a control circuit that supplies a control signal to the fiber stretcher to vary the total length of the fiber in response to the dispersion indicator from dispersion analyzer 232.

Figure 2C:
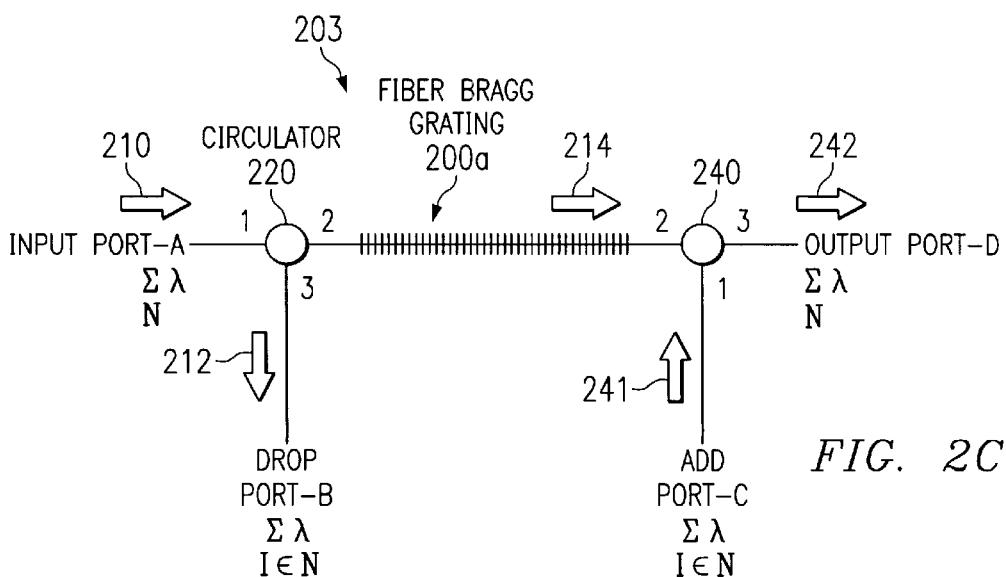

FIG. 2C shows a further exemplary WDM add-drop filter 203 related to filtering device 201 in FIG. 2A. An additional 3-port fiber optic circulator 240 is coupled to the distal terminal of FBG 200a. New WDM channels 241 hence can be added to the transmitted channels 214 through the circulator 240 to produce a new set of WDM output channels 242. Add/drop filter 203 has four external ports labeled as Port-A, Port-B, Port-C, and Port-D. Fiber grating 200a may be designed to reflect a single wavelength, a consecutive set of wavelengths, or alternating wavelengths. Wavelength add and drop multiplexing can be performed.

3. Phase Sampling Examples

The following describes specific design embodiments for the pure phase sampling or predominantly phase sampling techniques. The examples will be described with a specific reference to fiber Bragg gratings (FBGs) that are formed by spatial modulations in the refractive index of the fiber core.

It is understood that the present sampling techniques are not limited to specific examples and may be applicable to other gratings in wave-guiding conduits such as waveguides formed on substrates.

A fiber grating may be formed in a single-mode fiber by producing a modulated refractive index in its core: $n=n_{av}+\delta n$, where $n_{av}$ is the average refractive index in the core and $\delta n$ the index modulation pattern along the grating direction. The index modulation pattern in a sampled fiber grating can be approximately represented in the following form:

$$\delta n=S(z)n_1 \cos(\beta_g(z)z+c_1z^2+c_2z^3+\ldots)_2 \qquad (1)$$

where $S(z)$ is a periodic sampling function, $S(z)=S_b(z) \otimes \Sigma\delta(z-iP)$, $S_b(z)$ is referred to as the base sampling function between $0 \leq z \leq P$, which is periodically repeated with period P, z is the position along the grating, $n_1$ is the maximum index modulation, $\beta_g(z)$ is the grating wave number, $c_1, c_2 \ldots c_i$ represent linear, quadratic and the $i^{th}$ order chirp terms, respectively. The periodic sampling function may be expressed in the Fourier series:

$$S(z) = \sum_{-\infty}^{\infty} S_m \exp(i2m\pi z/P), \qquad (2)$$

where $S_m$ is the mth complex coefficient of the Fourier series.

3.1. Discrete Phase Sampling

The sampling may be a pure phase sampling so that the amplitude of the refractive index for the underlying grating structure is not changed by the sampling. Hence, the index modulation pattern is present in the entire volume of the fiber core that is allocated for the sampled grating structure. Such a pure phase sampling function $S(z)$ may be expressed in the following general form:

$$S(z)=\exp(i\phi(z)), \qquad (3)$$

wherein $\psi(z)$ represents the spatial phase distribution superimposed on the underlying grating structure along the fiber core. Since the sampling is periodic with a period P, the phase distribution satisfies $\psi(z+P)=\psi(z)$. The effect of the phase sampling is to periodically shift the phase of the index modulation pattern $\delta n(z)$ without changing the amplitude of $\delta n(z)$. This phase shift appears in the index variation, which may be expressed as $$\delta n(z)=n_1 \cos(\psi(z)+\beta_g(z)z+c_1z^2+c_2z^3+\ldots).$$

In one embodiment, $\psi(z)$ may include a spatial sequence of contiguous phase segments that have discrete phase values and equal widths (or equivalently lengths). Within each phase segment, the phase value $\psi(z)$ is a constant assigned to that particular segment. At least two different phase segments have different phase values. FIG. 3A shows a phase sampling function 300 according to this embodiment, where each sampling period P includes N phase segments with an equal widths of P/N. The phase values of N phase segments, $\psi_0, \psi_1, \ldots,$ and $\psi_{N-1}$, are selected according to a phase distribution function.

FIG. 3B illustrates an exemplary method for designing the phase segments in this sampling scheme by spatially interleaving $n_s=N^{1/2}$ different groups of sampling patterns 310, 320, 330, . . . , and 340 of the same period P each having $n_s$ spaced modulation segments to modulate both the phase and amplitude of the underlying grating structure. Consider a binary amplitude sampling where the index modulation is a series of evenly-spaced modulation segments without changing the phase:

$$S(z) = rect\left(\frac{z}{P/N}\right) \otimes comb\left(\frac{z}{P/n_s}\right), \qquad (4)$$

wherein rect(z) is 1 when $|z| \leq \frac{1}{2}$ and is 0 otherwise, $$comb(z) = \sum_{j=-\infty}^{\infty} \delta(z-j),$$

wherein $\delta(z)$ is the delta function ($\int \delta(z)dz=1$) and $n_s$ is the number of modulation segments of this group in each period P and is also the approximate number of different channels to be produced by the sampling of this group. Each segment has width of P/N, and the spacing between two adjacent segments is $P/n_s$. The index modulation is present in each modulation segment and is absent in the space of width $P/n_s-P/N$ between two adjacent modulation segments. The frequency response of the sampling $S(z)$ is the Fourier transform of $S(z)$:

$$F\{S(z)\} = comb\left(\frac{f}{n_s f_0}\right) \cdot sinc\left(\frac{f}{Nf_0}\right), \qquad (5)$$

wherein $sinc(z)=sin(\pi z)/(\pi z)$ and $f_0$ is the channel spacing of the multiple channels generated by the interleaved sampling:

$$f_0 = \frac{c}{2n_{av}P}. \qquad (6)$$

For a fiber core with an index of about 1.5, the channel spacing $f_0 \approx 100$ GHz/P(mm). Hence, a sampling period P of about 1 mm may be used to achieve a channel spacing of 100 GHz.

The phase values of the $n_s$ different amplitude segments in the amplitude sampling defined in Eq.(4) may be assigned some values according to a selected phase distribution function to produce a spatial sampling function that generally modulates both the phase and amplitude of the underlying grating structure. The phase values of consecutive modulation segments according to the selected phase distribution function repeat spatially at the sampling period P. When a segment is assigned a phase value of zero, the amplitude modulation does not undergo a phase shift in that segment. When a segment is assigned a non-zero phase value, the phase of amplitude modulation in that entire segment is uniformly shifted by that phase value at each and every location in that segment. The relative phase between any two different locations in that same segment, however, remains unchanged.

The locations and phase values of the segments can be selected to produce $n_s$ different sampling functions that are spatially interleaved together. Each sampling function includes a set of $n_s$ different modulation segments spaced by $P/n_s$ whose phase value pattern repeats with the sampling period P. Hence, the phase values of the different segments may be represented by $\psi_{kj}$, where k, j, =0, 1, 2, . . . , and $n_s-1$. The parameter k is a group parameter representing different groups of segments or sampling functions and j is the segment parameter representing different modulation segments in each group or sampling function within each sampling period P. In FIG. 3B, for example, the first sampling function 310 (k=0) may comprise a set of $n_s$ segments with phase values $\psi_{00}, \psi_{01}, \psi_{02}, \ldots,$ and $\psi_{0(ns-1)}$ in each sampling period P according to a first phase distribution; the second sampling function 320 (k=1) may comprise another set of $n_s$ segments with phase values $\psi_{10}, \psi_{11}, \psi_{12}, \ldots,$ and $\psi_{1(ns-1)}$ in each sampling period P according to a second, usually different phase distribution; and so on for other sampling functions including 330 and 340 as indicated. Notice that the different sampling functions 310, 320, 330, . . . , and 340 are spatially shifted by P/N so that the modulation segments of $n_s$ different sampling functions do not overlap and are spatially interleaved together. The $n_s$ different sampling functions are spatially added to form a total of $N=n_s^2$ contiguous segments without gaps in each period P to form a pure phase sampling pattern as illustrated in FIG. 3A.

The following describes two examples for N=4 and N=16 to illustrate the structures and designs of such phase sampling gratings.

Referring to FIGS. 4A through 4F, the first spatial sampling pattern 410a represents $n_s=2$ with two modulation segments in each period P. The respective channels 410c in the frequency domain produced by this sampling pattern 410a are shown under a sinc amplitude profile 410b, where the channel spacing is twice the desired channel spacing $f_0$. The region where the index modulation in the underlying grating is present without phase change is represented by "1" (i.e., a modulation segment) and the region where the index modulation is absent is represented by "0" (i.e., a void).

Now consider a second spatial sampling function represented by the sampling pattern 420a which is obtained by changing the phase of the index modulation in every other region "1" in the sampling pattern 410a by 180 degrees. The numeral "−1" is used to represent the regions whose phase values are so changed. The Fourier transform of this second sampling pattern 420a also has channels that are also spaced by $2f_0$ with a sinc amplitude profile 420b. However, the above phase shift in the spatial domain results in an overall frequency shift by $f_0$ for all channels in the frequency domain. Hence, the channels 410c produced by the first sampling pattern 410a and the channels 420c produced by the second sampling pattern 420a are interleaved in the frequency domain. If the channels 410c and the channels 420c can be combined, the final output channels would double the number of channels under the sinc amplitude profile 430b with a channel spacing of $f_0$.

This desirable frequency output with both channels 410c and 420c interleaved can be achieved by adding both spatial sampling patterns together since their Fourier transforms are linearly additive. In particular, because the Fourier transform amplitudes in the frequency domain are invariant with respect to a position shift of the spatial sampling pattern in the space domain, the two different spatial sampling patterns 410a and 420a can be spatially shifted relative to each other to achieve a desired combined spatial sampling pattern without changing the spectral amplitudes of the interleaved channels. One aspect of the present technique is to utilize this freedom in the space domain to combine and interleave two or more spatial sampling patterns so that a pure phase sampling pattern, rather than an amplitude sampling pattern, can be generated. In this way, the interleaved spatial sampling pattern 430a is formed so as to substantially eliminate the voids "0" present in both the sampling functions 410a and 420a.

In the example illustrated, the position of the first spatial amplitude sampling pattern 410a can be shifted to produce two alternative sampling patterns: S1=[1010], S1'=[0101]. A total of four different sampling patterns, however, can be generated from shifting the position of the second spatial amplitude sampling pattern 420a: S2=[010-1], S2'=[10-10], S2"=[0-101], and S2'''=[−1010]. Therefore, the amplitude sampling patterns 410a and 420a be combined in eight different combinations as listed in TABLE IA by adding two amplitude patterns in two different relative positions, one without any overlap between "0" regions and another with overlaps between "0" regions. The numeral "2" in TABLE IA represents segments that have an amplitude that doubles the amplitude of the initial grating.

TABLE IA

|  | 010-1 | 10-10 | 0-101 | −1010 |
|---|---|---|---|---|
| 1010 | 111-1 | 2000 | 1-111 | 0020 |
| 0101 | 0200 | 11-11 | 0002 | −1111 |

Notably, each of the four combinations without a single "0" region in each sampling period does not change the index amplitude in the fiber core and hence is a pure phase sampling pattern. The combined phase sampling pattern 430a in FIG. 4C represents the pure phase sampling of the four different combination phase periods exhibited in Table IA. Each is an example for the phase sampling shown in FIG. 3 with N=4. The actual number of channels in the output spectrum between the zeroes of the sinc envelope function is 2N−1=7. The length of each phase segment is 1 mm/N=0.25 mm to achieve a channel spacing of 100 GHz.

Figure 4G:
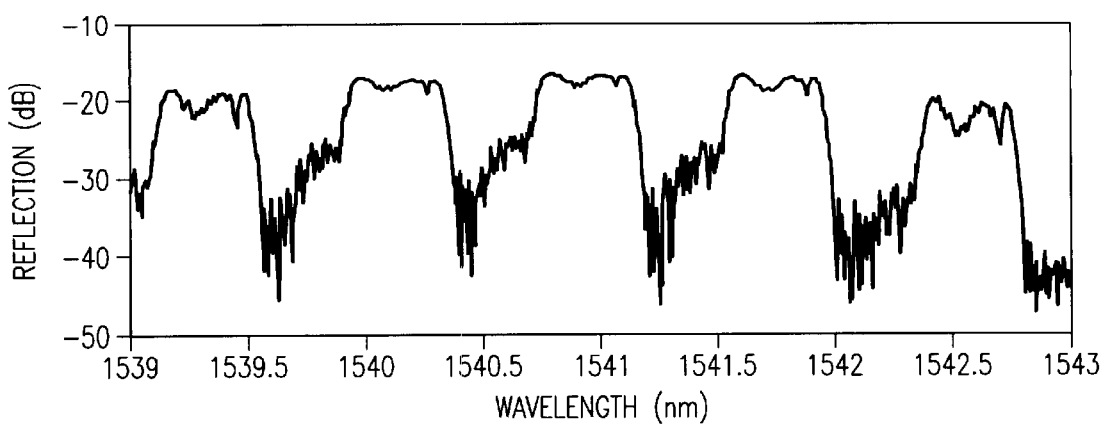
FIGS. 4G and 4H show measured reflective spectra and group delays of several channels as a function of wavelength in a phase-sampled fiber grating fabricated according to the discrete phase sampling design shown in FIGS. 4C and 4F.
Figure 4H:
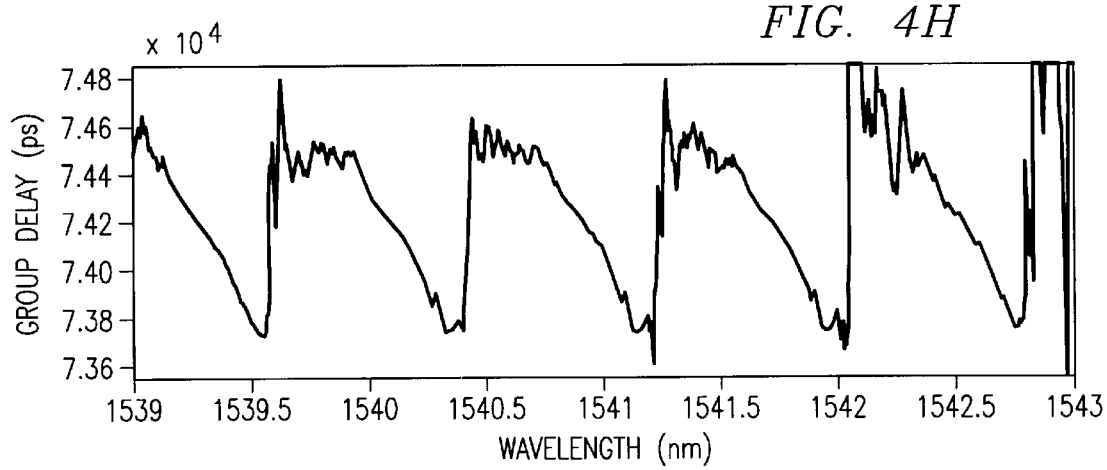

FIGS. 4G and 4H show measured reflective spectra and group delays of several channels as a function of wavelength of a phase-sampled fiber grating fabricated according to the design shown in FIGS. 4C and 4F.

The above example illustrates the interleaving of two, 2-channel phase sampling patterns with discrete phase segments. The technique can be extended to interleave $n_s$ groups of $n_s$ channels to achieve a total number $N=n_s^2$ channels. In general, the phase for each segment of length $\Delta z=P/N$ in a sampling period P is given by $$\phi_{jn_s+k} = \frac{2\pi}{n_s}(j-j_0)(k-k_0) + \phi_{arb}(k), \tag{7A}$$

and the resultant phase sampling function is $$S(z) = rect\left(\frac{z}{\Delta z}\right) \otimes \sum_{j,k=0}^{n_s-1} \exp[i\phi_{n_s j+k}] \cdot comb[(z-(n_s j+k)\Delta z)/P], \tag{7B}$$

wherein $n_s^2=N$, $\phi_{arb}(k)$ is an arbitrary phase, $j_0$ and $k_0$ are arbitrary origin values, and j and k are respectively given by 0, 1, 2, . . . , $(n_s-1)$. The index k can be used to represent different spatial sampling functions with both phase and amplitude modulations, and accordingly the index j can be used to represent different modulation segments in each sampling function. The index, $jn_s+k$, therefore, represents the final interleaved phase segments within each period P. In the following examples $\phi_{arb}(k)$, $j_0$ and $k_0$ are all taken to be zero. In FIGS. 4A–4H where $n_s=2$, for example, the above equation (7A) can be used to generate the phase assignment to four different phase segments in each period P as listed in TABLE IB. The values for k=0 correspond to the two segments from the first sampling function 410a and the values for k=1 correspond to two segments from the second sampling function 420a, respectively.

TABLE IB

|  | j = 0 | j = 0 | j = 1 | j = 1 |  |
|---|---|---|---|---|---|
| Phase values | 0 |  | 0 |  | k = 0 |
| $\phi_{jn_s+k}$ |  | 0 |  | π | k = 1 |
| Interleaved Phase segments in one period P ($\exp i\phi_{jn_s+k}$) | 1 | 1 | 1 | −1 |  |

For a given set of selected phase values, $\phi_{jn_s+k}$, the sequence of the different phase val can be rotated without changing the spectral amplitudes of the sampled grating in the frequency domain. This is because the Fourier transform in the frequency domain is invariant with respect to a position shift in the space domain. For example, the phase value for $(jn_s+k)=0$ can be rotated to a position for $(jn_s+k)=1$, the value for the phase value for $(jn_s+k)=1$ can be rotated to a position for $(jn_s+k)=2$, . . . , and the phase value for $(jn_s+k)=N$ can be rotated to a position for $(jn_s+k)=0$. a total of N different rotations are possible. Referring to TABLE IA, in addition to the phase assignment (111-1) as shown in FIGS. 4A–4H, three other different but equivalent phase assignments, (11-11), (1-111), and (−1111) can also be used to produce the same spectral output.

Therefore, the above spatial-domain discrete phase sampling technique can generate a set of $N=n_s^2$ adjacent channels separated by frequency $f_0$ with a minimum of amplitude modulation to the underlying Bragg index grating. The phase sampling includes a number of $n_s$ constituent amplitude and phase sampling patterns that are interleaved to form the final contiguous phase sampling pattern of a length P with a sampling period of P. Each constituent amplitude and phase sampling pattern, however, has a smaller interleaving period $P/n_s$, and includes periodic spatial phase segments with a constant segment length $d<P/n_s$ so that each sampling period includes a spatial region of a length of $(P/n_s-d)$ that has zero amplitude. Different constituent phase sampling patterns may have equal or different lengths of phase segments, dj, where $j=1, 2, \ldots, n_s$ represents different constituent phase sampling patterns. The total length of $n_s$ different phase segments respectively from $n_s$ constituent phase sampling patterns should be equal to the interleaving period $$P/n_s: \sum_j d_j = P/n_s.$$

This condition allows the $n_s$ different constituent phase sampling patterns to be interleaved without gaps therebetween, and thereby attain phase only sampling, substantially without amplitude modulation.

Each of the $n_s$ different constituent phase sampling patterns produces a group of $n_s$ channels spaced by $n_s f_0$, where $f_0$ the desired channel frequency separation $f_0=c/2n_{avg}P$. Each group corresponds to different value of the index k in Eq. (7A). Hence, a total of $n_s$ different groups of $n_s$ channels each are generated by the interleaved phase sampling patterns. The phase shifts described in Eq. (7A) for equal-length interleaved phase segments cause frequency shifts between different groups of channels to obtain a total of $N=n_s^2$ equally-spaced channels with a spacing of $f_0=c/2n_{avg}P$. Hence, the proper selection of the phase shifts between the interleaved, different constituent phase sampling patterns is one important aspect in designing a suitable sampling pattern. Alternately, the phase values of the phase segments may be modified to be deviated from that values as defined in Eq. (7A) so as to generate non-uniformly spaced channels.

TABLE II (for ease of understanding incorporated into FIG. 5) exemplifies the detailed phase values of N=16 for a phase sampling function that is formed from interleaving 4 groups A (k=0), B (k=1), C (k=2), and D (k=3) of 4 equal-length phase segments in a sampling period. FIG. 5 shows the respective interleaved and equally-spaced channels under a sinc amplitude envelope in the frequency domain. The amplitudes of the output channels from the above phase sampling pattern are not substantially equal and vary from channel to channel according to a sinc envelope. Different phase sampling patterns with discrete, contiguous phase segments, however, can be used to achieve substantially uniform amplitudes for different channels.

FIG. 6A illustrates a example of a different phase sampling pattern that also has discrete phase segments, but the segment lengths are unequal. This scheme is contemplated to provide substantially equal amplitudes at different channels. The periodic phase structure is lined up in sequence along a single-mode fiber core to interact with input light with multiple channels of optical beams at different wavelengths that propagate along the fiber core. The reflected output thus includes distinctive channels separated by the channel spacing.

Assume the sampling base function $S_b(z)$ is a phase-only step function that includes N discrete phase segments of varying segment lengths in each sampling period:

$$S_b(z) = \sum_{n=0}^{N} \exp(i\varphi_n) \cdot rect\left[\frac{z - (z_{n+1} - z_n)/2}{z_{n+1} - z_n}\right], \quad (8)$$

where $z_n$ denotes the phase transition positions between different phase segments within the sampling period, and $\psi_n = 2\pi k/L$ (k=0,1, 2, . . . , L) with L being the number of phase levels. The $m^{th}$ Fourier coefficients of $S_b(z)$ are given as $$S_0 = 2\sum_{n=0}^{N}(z_{n+1} - z_n)\exp[i\varphi_n] \text{ for } m = 0 \quad (9)$$

$$S_m = \quad (10)$$

$$\frac{-1}{2im\pi}\sum_{n=0}^{N}[(\exp(-2i\pi m z_{n+1}) - \exp(-2i\pi m z_n)]\exp[i\varphi_n] \text{ for } m \neq 0$$

These coefficients represent the complex amplitudes of the Fourier transform result of the periodic phase-only sampling function. Correspondingly, the intensity of the $m^{th}$ Fourier coefficient, or $I_m$ can be written as $$I_m(z_0,z_1, \ldots ,z_N;\psi_0,\psi_1, \ldots ,\psi_N) = |S_m|^2, m=0,\pm1, \ldots \pm M. \quad (11)$$

Hence, $I_m$ is determined by both the phase-transition positions and the discrete phase values of the phase segments In general, $I_m$ may have any arbitrary magnitude in the range from 0 to 1. For WDM applications, the phase transition positions and discrete phase values can be specially selected to produce a desired channel response envelope among the (2M+1) wavelength channels:

$$I_m(z) = \alpha_m I_0(z), m=0,\pm1, \ldots \pm M, \quad (12)$$

where $\alpha_m$ are the channel amplitude coefficients. For a uniform envelope, the values of different coefficients $\alpha_m$ are all equal to 1. However, the values of $\alpha_m$ may be adjusted to deviate from the value 1 to generate any desired channel envelope function. For example, if some value(s) $\alpha_m$ are zero, these channel(s) would disappear from the reflectivity spectrum. Eqs. (9)–(12) form a set of nonlinear equations and can be solved numerically by, e.g., using computer software.

It is also desirable to maximize the total intensity of the 2M+1 Fourier coefficients since higher order Fourier coefficients, which are not limited by the condition imposed in Eq. (12), are not zeros and thus the corresponding signals can divert useful filtered light from the desired output channels. To accomplish this, a merit function f(z) is defined as follows to optimize the uniformity of the desired channels and minimize the out-of-band signals:

$$f(z) = \sum_{m=-M}^{M} ([I_m(z) - \alpha_m I])^2, \tag{13}$$

$$I = \eta \bigg/ \left( \sum_{m=-M}^{M} \alpha_m \right), \tag{14}$$

$$\eta = \sum_{m=-M}^{M} I_m(z), \tag{15}$$

where η is a target efficiency. Subject to satisfaction of the merit function, solutions of phase transition positions $(z_0, z_1, \ldots, z_N)$ and the associated phase values $(\psi_0, \psi_1, \psi_N)$ can be found using an iterative algorithm such as simulated thermal annealing to perform the optimization with a computer. For example, a change in the channel amplitude coefficients $\alpha_m$ changes the values of the phase transition positions and associated phase values in the phase sampling pattern in FIG. 6A.

FIG. 6B illustrates one embodiment of the simulated thermal annealing algorithm in determining the transition positions for a given set of phase values in the design shown in FIG. 6A. The merit function of Eq. (13) is used as the error indicator to represent the degree of variations in the amplitude of the different output channels in the frequency domain. At step 610, initial values for the transition positions are set and the f(z) is calculated (not shown explicitly in FIG. 6B). At step 620, the initial values for the positions are adjusted to produce a new set of position values according to a distribution function, e.g., random variations from the initial values. The value of f(z) for the new positions and the difference $\Delta f = (f_{new} - f_{old})$ are calculated. The new set of position values is always accepted to replace the old position values if $\Delta f \leq 0$. A probability function is defined by $P(\Delta f) = \exp(-\Delta f/T)$, where T is an adjustable 'temperature' parameter and is set at an initial positive value. If $\Delta f \geq 0$, the new set of position values will be accepted to replace the old position values on a statistical basis with a probability $P(\Delta f)$. That is, in N such iterations the new set of positions would be accepted $P(\Delta f)N$ times and rejected $(1-P(\Delta f))N$ times.

If the number of iterations completed is less than a selected iteration number, repeat the steps 620 and 630 until the selected iteration number is reached (step 640). Next at step 650, the temperature parameter T is reduced and a new set of positions is generated based on the results from steps 620 and 630. At step 660, the function f(z) in Eq. (13) is computed again based on the new set of position values. If f(z) is less than an acceptable minimum value, the process is complete, and the latest position values are used as the transition positions in the phase sampling grating (step 670). If f(z) is greater than the acceptable minimum value, the above process repeats until a set of acceptable position values is generated.

The parameter T is analogous to the temperature and the probability $P(\Delta f)$ is analogous to a probability function of a thermal energy for different position values. Hence, the above iteration process simulates a slow cooling process to reduce the thermal energy. The phase values can also be varied, e.g., randomly, based on the same process so that the above iteration can be used to determine both phase transition positions $(z_0, z_1, \ldots, z_N)$ and the associated phase values $(\psi_0, \psi_1, \ldots, \psi_N)$.

Now consider a simple case with only two phase levels, 0 and π. Eqs. (9), (10), and (11) can thus be simplified as:

$$I_0 = \left[ 2 \sum_{n=0}^{N} (-1)^{n+1} z_n - 1 \right]^2, \tag{16}$$

$$I_m = 4[F_R^2(m) + F_I^2(m)], \tag{17}$$

where $$F_R(m) = \frac{1}{2m\pi} \sum_{n=0}^{N} (-1)^{n+1} \sin(2\pi m z_n), \tag{18}$$

$$F_I(m) = \frac{1}{2m\pi} \sum_{n=0}^{N} (-1)^{n+1} \cos(2\pi m z_n). \tag{19}$$

Numerical iterations may be used to solve the above equations to obtain a set of solutions for the phase transition positions $(z_1, z_2, \ldots, z_N)$.

In general, to design a binary phase-change modulated FBG with an odd number of uniform response wavelength channels K, the number of phase transition points N for the sampling base function $S_b(z)$ is $$N \geq (K+1)/2. \tag{20}$$

However, to design a binary phase-change modulated FBG with an even number of uniform response wavelength channels K, the response of the even numbered channels are suppressed by design, i.e.

$$I_{-2K}(z) = \ldots = I_{-2}(z) I_0(z) = I_2(z) \ldots = I_{2K}(z) = 0; \tag{21}$$

In addition, the following condition is imposed:

$$I_{-2K-1}(z) = \ldots I_{-3} = I_{-1}(z) = I_1 = I_3 \ldots = I_{2K+1}(z); \tag{22}$$

Under these conditions, the number of phase transition points K of the sampling base function $S_b(z)$ is $$N \geq K+1. \tag{23}$$

Since the even number case is a case where interleaving channels are absent, the spacing between the remaining channels is twice as large as in the odd number case. Thus, for example, to obtain 100 GHz channel spacing a ~2 mm period of the base sampling function is required.

Figure 7:
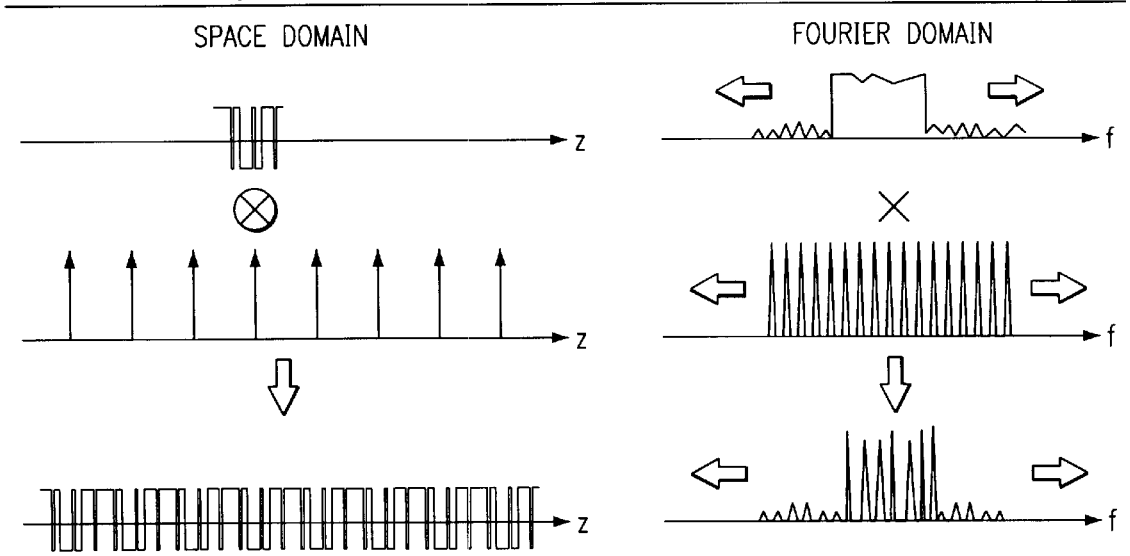
FIG. 7 illustrates the Fourier analysis of a binary-phase implementation based on the design in FIG. 6A.

FIG. 7 shows a step-by-step Fourier analysis of a seven-channel sampled fiber grating based on the phase sampling shown in FIG. 6A. The pattern shown on the left side are space-domain grating patterns. Shown on the right side are Fourier domain correspondences. Note that the designed frequency spacing of the seven wavelength channels of the binary-phase-change modulated FBG coincides with that of the interference pattern introduced by the periodic sampling. In the top left the Dammann base pattern has a Fourier transform (top right) which gives the envelope of the channels to be generated. Periodic repetition of the base pattern (convolution with a periodic array of delta functions) yields a Fourier transform which is an array of seven channels (lower right).

Figure 8A:
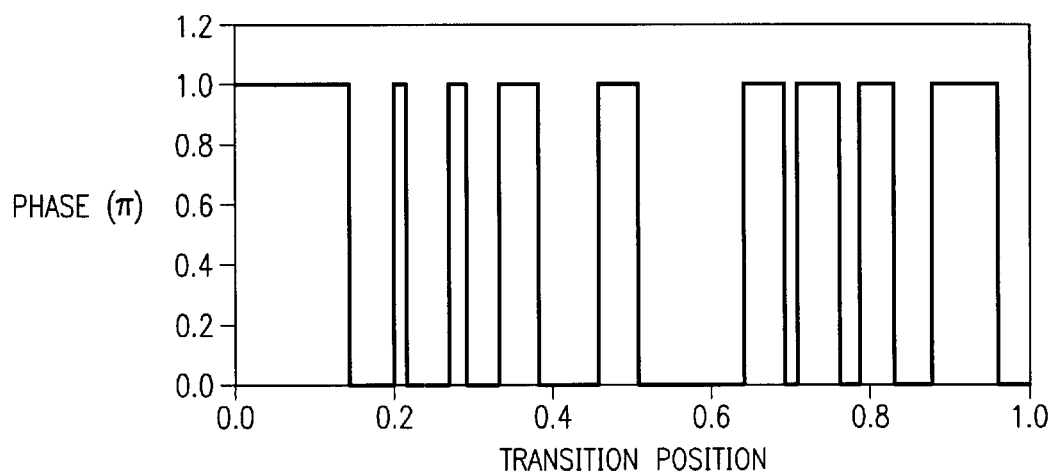
FIGS. 8A–8B, 9A–9B, 10A–10B, and 11A–11C show computed responses of different exemplary sampling patterns based on the design in FIG. 6A.
Figure 8B:
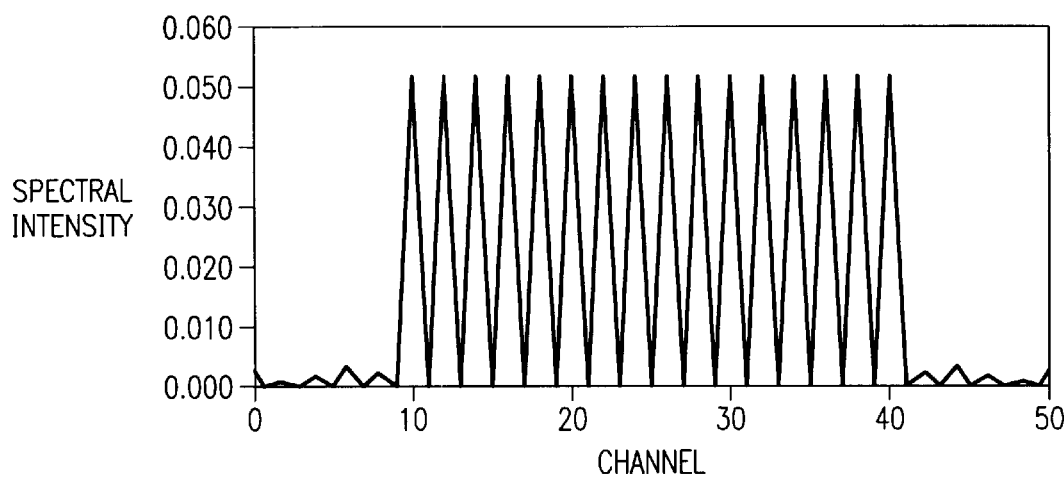
Figure 9A:
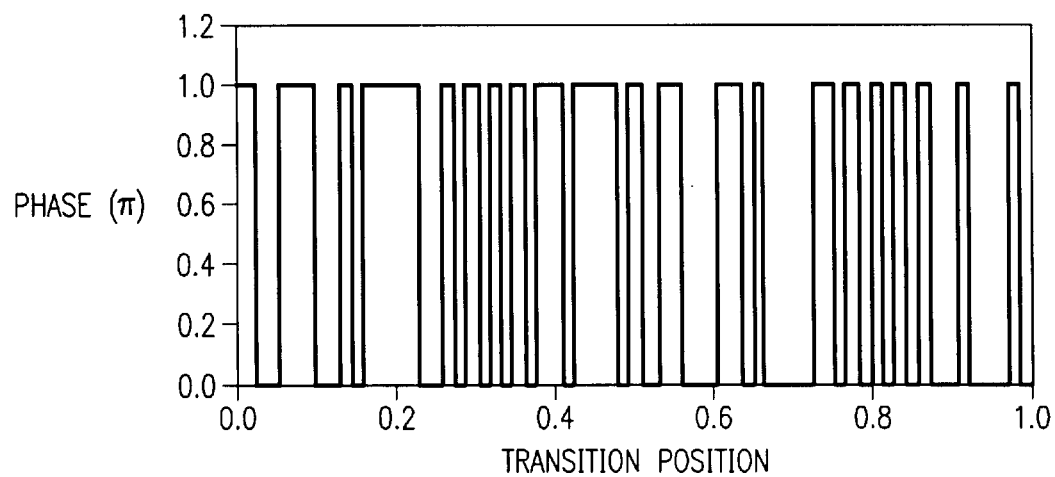
Figure 9B:
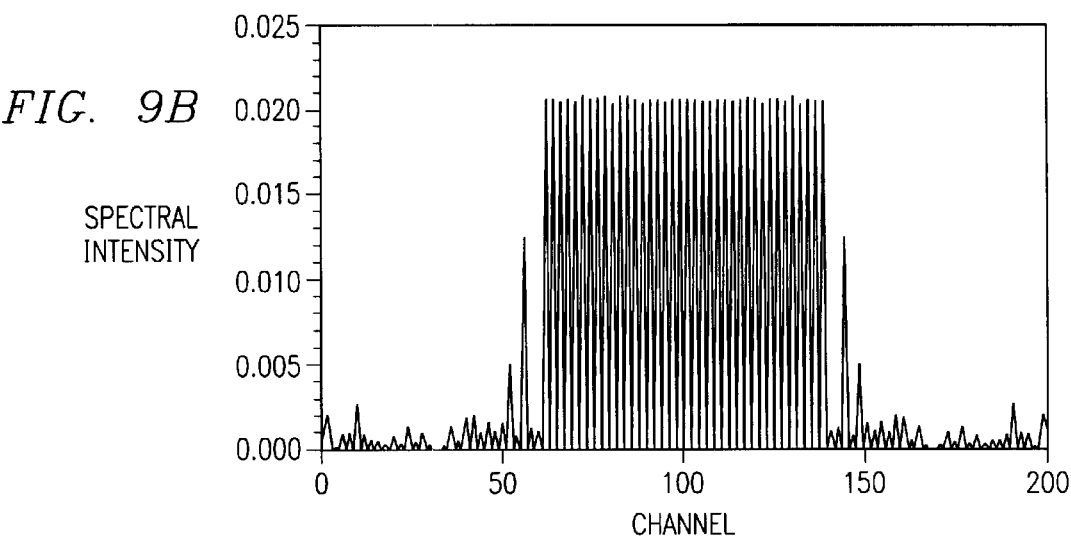
Figure 10A:
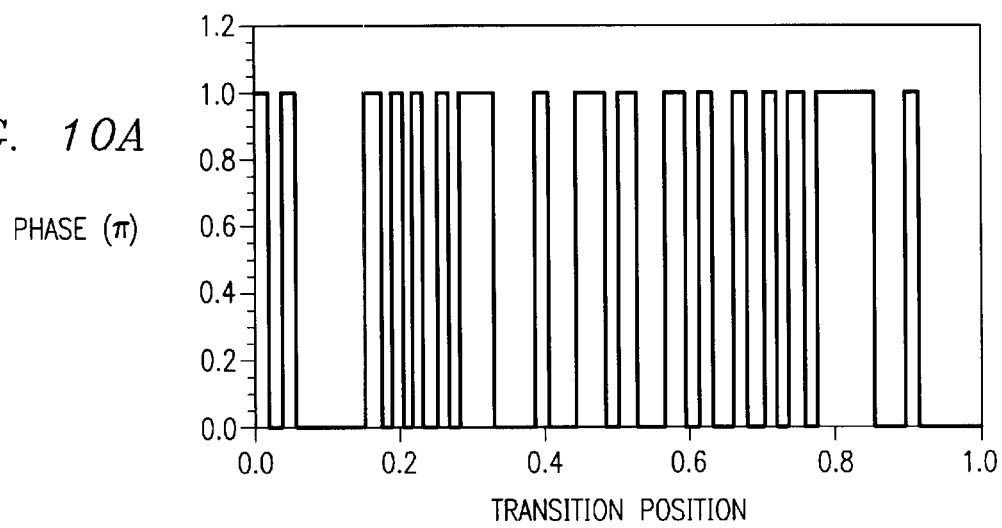
Figure 10B:
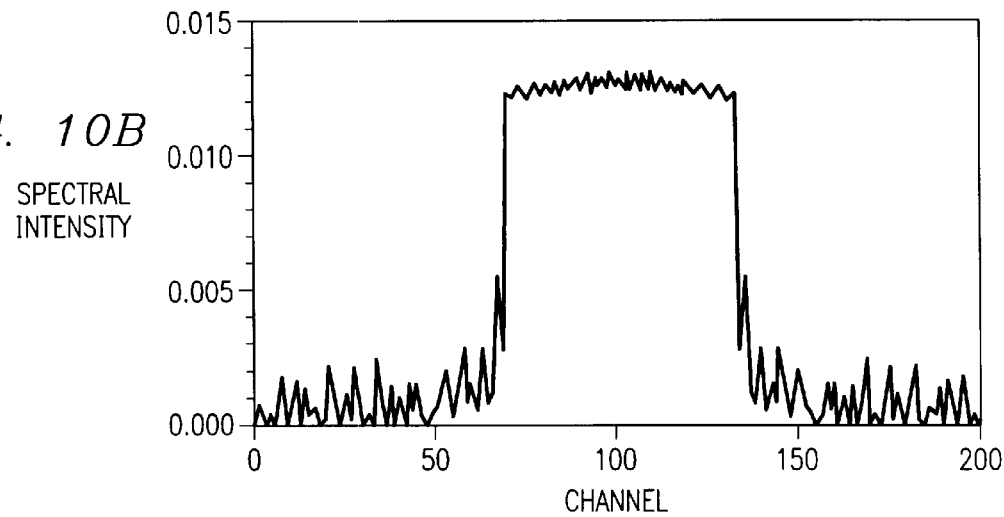

FIGS. 8A–8B, 9A–9B, and 10A–10B show three exemplary binary-phase-change sampling function designs for 16-, 40- and 65-channel applications, respectively. In FIGS. 8A, 9A, and 10A the Dammann base sampling phase pattern is shown, where the phase varies between values of zero and π. This pattern repeats periodically in the FBG, and the corresponding spectral envelope of the channels is given by the Fourier transform in FIGS. 8B, 9B, and 10B respectively. The efficiency η used for the merit function is about 81%, 82% and 81% respectively for each of the three separate designs.

The amplitudes of Fourier components are substantially uniform with a mean variation less than 1.5%. Note that for the odd channel case shown in FIGS. 10A–10B, the Fourier domain response in FIG. 10B has a generally flat top over the wavelength span that covers all the designed channels. On the other hand, for the even channel number cases shown in FIGS. 8A–8B and 9A–9B, the condition in Eq. (21) makes the Fourier domain responses vanish between consecutive designed channels throughout the entire wavelength span. Thus, for the odd channel design in FIGS. 10A–10B, a sampling period of 1 mm would give a channel spacing of ~100 GHz, but for the even channel designs in FIGS. 8A and 9A, a 2 mm sampling period is required. Although a 2 mm period in principle yields a ~50 GHz channel spacing, the even channel designs are anti-symmetric about the midpoint of the base pattern (i.e., such that wherever the phase in the first half of the base pattern is zero, in the second half it is π), and therefore by phase cancellation the central channel on a 50 GHz grid and all the even channels vanish, leading to an actual channel spacing of 2×50=100 GHz. Detailed phase-transition data of the three designs are given in Table IIIA, Table IIIB and Table IIIC, respectively. Thus for example, in the 16 channel design of FIG. 8A and Table IIIa, the phase is zero between z=0 and z=0.142331, whereas at the corresponding location in the second half of the pattern, i.e., between z=0.5 and z=0.5+0.142331, the phase is π.

Figure 11A:
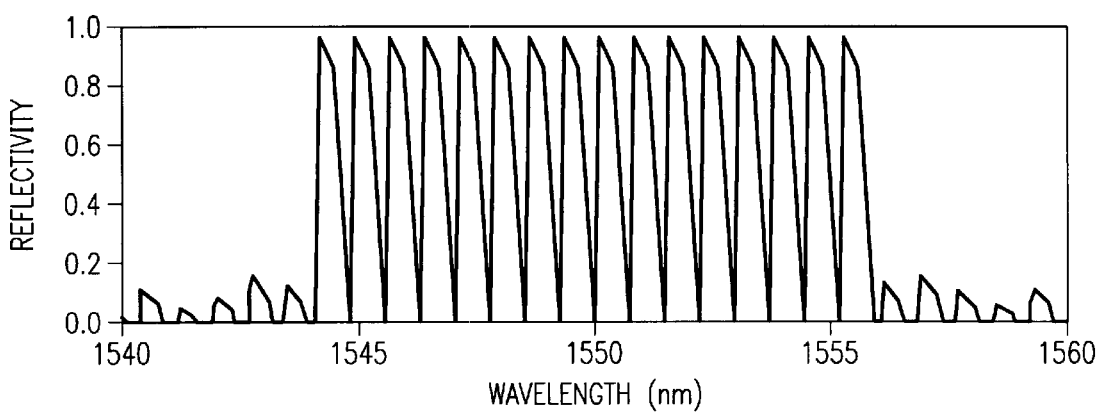
Figure 11B:
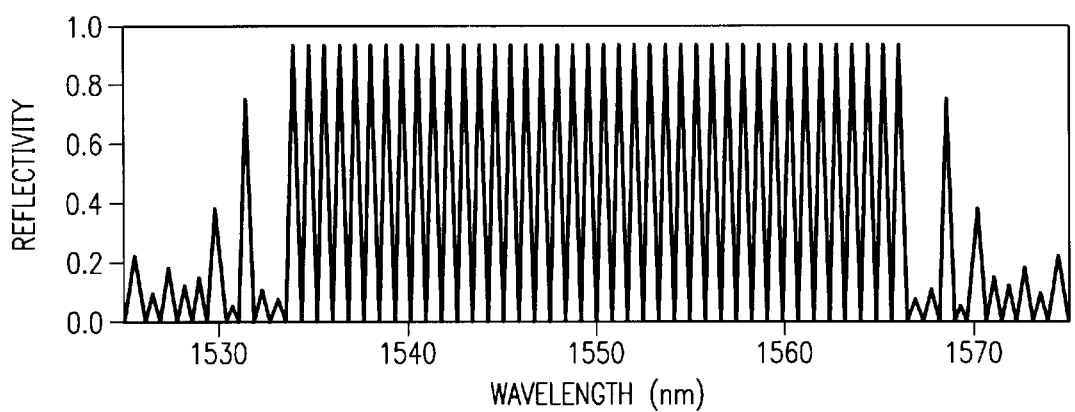
Figure 11C:
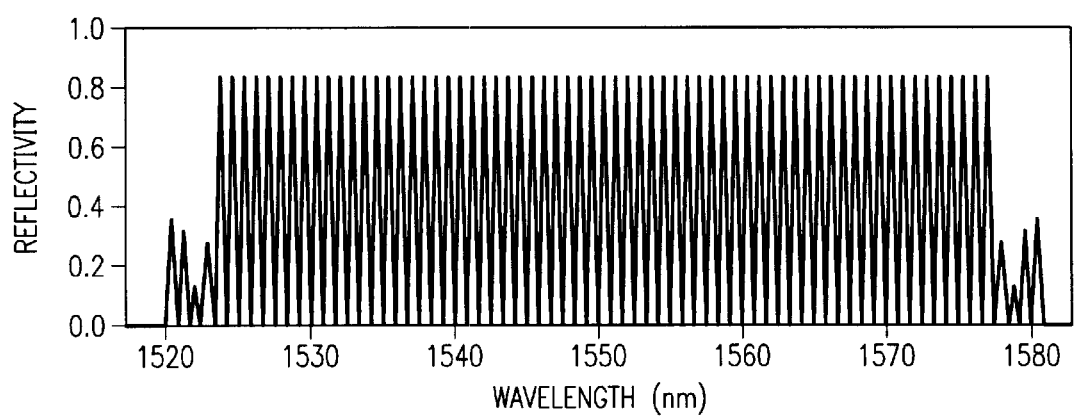
Figure 12A:
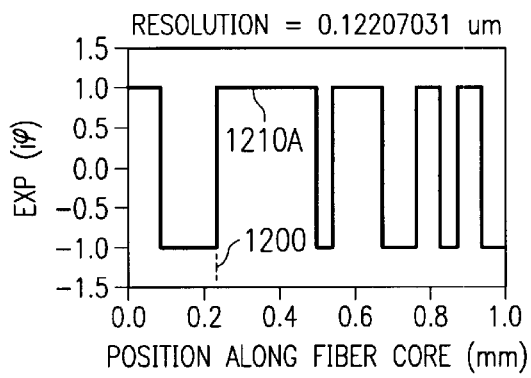
FIGS. 12A–12F illustrates a technique of adjusting amplitude modulation to compensate for inaccuracies in fabrication.
Figure 12D:
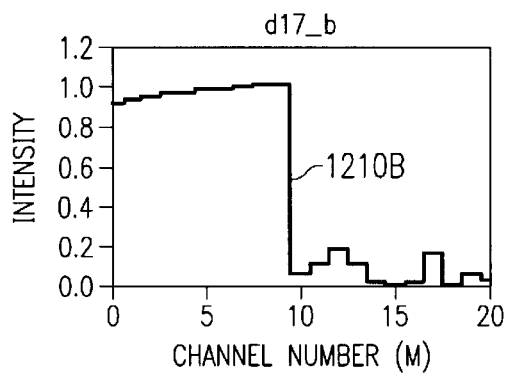
Figure 12B:
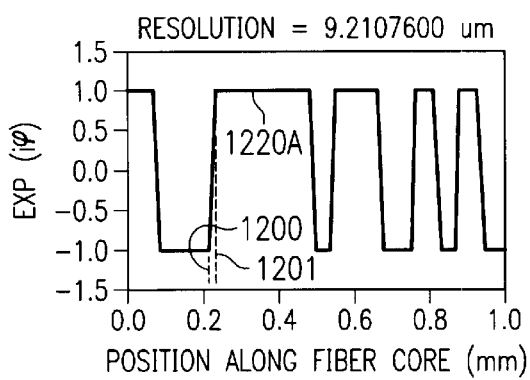
Figure 12E:
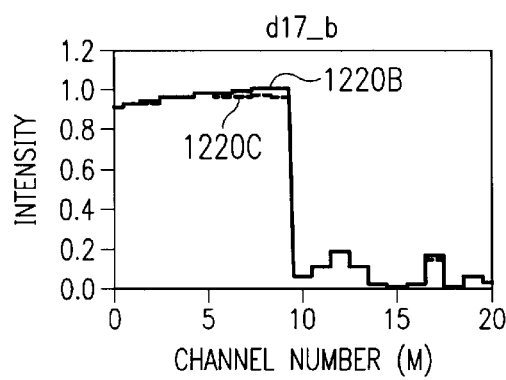
Figure 12C:
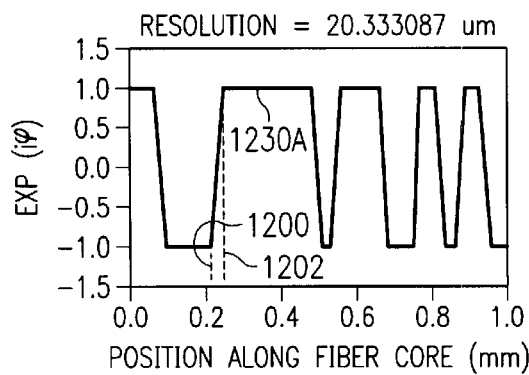
Figure 12F:
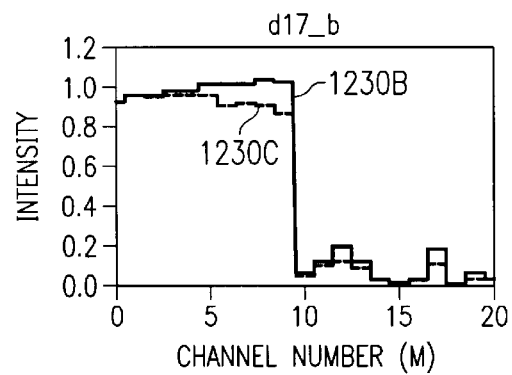

FIGS. 11A–11C show simulation results of the above phase sampled gratings of FIGS. 8A–8B, 9A–9B, and 10A–10B based on a transfer matrix method. The simulated reflectivities of these gratings closely match the direct Fourier transforms shown in FIGS. 8B, 9B, and 10B. This indicates that this approach can be used to make fiber Bragg gratings with highly uniform amplitude response over multiple channels. An examination of the response of each channel also demonstrates that the dispersive characteristics are also uniform. However, if the sampling period P is designed to vary slowly over the length of the fiber, then a variation in the dispersive properties from channel to channel can be achieved.

TABLE IIIA

Phase transition positions for a 16-channel design

| Transition | Position | Phase Change |
|---|---|---|
| Z1 | .142331E+00 | 0→π |
| Z2 | .193346E+00 | π→0 |
| Z3 | .210017E+00 | 0→π |
| Z4 | .261666E+00 | π→0 |
| Z5 | .286102E+00 | 0→π |
| Z6 | .329654E+00 | π→0 |
| Z7 | .378405E+00 | 0→π |
| Z8 | .457695E+00 | π→0 |
| Z9 | .500000E+00 | 0→π |
| Z10 | .642331E+00 | π→0 |
| Z11 | .693346E+00 | 0→π |
| Z12 | .710017E+00 | π→0 |
| Z13 | .761666E+00 | 0→π |
| Z14 | .786102E+00 | π→0 |
| Z15 | .829654E+00 | 0→π |
| Z16 | .878405E+00 | π→0 |
| Z17 | .957695E+00 | 0→π |
| Z18 | 1.000000E+00 | π→0 |

TABLE IIIB

Phase transition points for a 40-channel design

| Transition | Position | Phase Change |
|---|---|---|
| Z1 | .251899E-01 | 0→π |
| Z2 | .526579E-01 | π→0 |
| Z3 | .947453E-01 | 0→π |
| Z4 | .127184E+00 | π→0 |
| Z5 | .143830E+00 | 0→π |
| Z6 | .154756E+00 | π→0 |
| Z7 | .226661E+00 | 0→π |
| Z8 | .254389E+00 | π→0 |
| Z9 | .268355E+00 | 0→π |
| Z10 | .285674E+00 | π→0 |
| Z11 | .299951E+00 | 0→π |
| Z12 | .312317E+00 | π→0 |
| Z13 | .326369E+00 | 0→π |
| Z14 | .341400E+00 | π→0 |
| Z15 | .358012E+00 | 0→π |
| Z16 | .373029E+00 | π→0 |
| Z17 | .405503E+00 | 0→π |
| Z18 | .418507E+00 | π→0 |
| Z19 | .471574E+00 | 0→π |
| Z20 | .483916E+00 | π→0 |
| Z21 | .500000E+00 | 0→π |
| Z22 | .525190E+00 | π→0 |
| Z23 | .552658E+00 | 0→π |
| Z24 | .594745E+00 | π→0 |
| Z25 | .627184E+00 | 0→π |
| Z26 | .643830E+00 | π→0 |
| Z27 | .654756E+00 | 0→π |
| Z28 | .726661E+00 | π→0 |
| Z29 | .754390E+00 | 0→π |
| Z30 | .768355E+00 | π→0 |
| Z31 | .785674E+00 | 0→π |
| Z32 | .799951E+00 | π→0 |
| Z33 | .812317E+00 | 0→π |
| Z34 | .826369E+00 | π→0 |
| Z35 | .841400E+00 | 0→π |
| Z36 | .858012E+00 | π→0 |
| Z37 | .873029E+00 | 0→π |
| Z38 | .905503E+00 | π→0 |
| Z39 | .918507E+00 | 0→π |
| Z40 | .971574E+00 | π→0 |
| Z41 | .983916E+00 | 0→π |
| Z42 | 1.00000E+00 | π→0 |

TABLE IIIC

Phase transition points for a 65-channel design

| Transition | Position | Phase Change |
|---|---|---|
| Z1 | .173687E-01 | 0→π |
| Z2 | .322847E-01 | π→0 |
| Z3 | .500213E-01 | 0→π |
| Z4 | .144987E+00 | π→0 |
| Z5 | .166690E+00 | 0→π |
| Z6 | .183856E+00 | π→0 |
| Z7 | .197629E+00 | 0→π |

TABLE IIIC-continued

Phase transition points for a 65-channel design

| Transition | Position | Phase Change |
|---|---|---|
| Z8 | .209695E+00 | π→0 |
| Z9 | .227631E+00 | 0→π |
| Z10 | .247535E+00 | π→0 |
| Z11 | .260972E+00 | 0→π |
| Z12 | .280396E+00 | π→0 |
| Z13 | .328003E+00 | 0→π |
| Z14 | .382638E+00 | π→0 |
| Z15 | .404908E+00 | 0→π |
| Z16 | .439100E+00 | π→0 |
| Z17 | .485029E+00 | 0→π |
| Z18 | .501013E+00 | π→0 |
| Z19 | .528194E+00 | 0→π |
| Z20 | .564614E+00 | π→0 |
| Z21 | .593773E+00 | 0→π |
| Z22 | .614491E+00 | π→0 |
| Z23 | .630001E+00 | 0→π |
| Z24 | .657388E+00 | π→0 |
| Z25 | .677399E+00 | 0→π |
| Z26 | .702485E+00 | π→0 |
| Z27 | .717439E+00 | 0→π |
| Z28 | .737727E+00 | π→0 |
| Z29 | .756822E+00 | 0→π |
| Z30 | .777529E+00 | π→0 |
| Z31 | .855382E+00 | 0→π |
| Z32 | .895943E+00 | π→0 |
| Z33 | .917911E+00 | 0→π |

In fabricating actual fiber gratings based on the phase sampling design in FIG. 6A, it can be difficult to produce a perfect step in the phase transition from one phase segment to an adjacent segment of a different phase value. Instead, the phase value in many practical fiber gratings usually changes over a spatial range at the boundary between two adjacent phase segments. Hence, a transition phase region exists between two adjacent phase segments of different phase values and the phase value of the grating structure in this transition phase region is not the assigned phase value of either of the two segments but changes from a first phase value at a first position to a second phase value at a second position. It is discovered that this gradual transition can adversely affect the uniformity of the amplitudes of the different channels in the frequency domain. Referring to Eq. (11), as a result of such a transition width, the amplitude generally decreases as the number of channels, $|M|$, increases. Depending on the size of the spatial transition width, the variation in the channel amplitudes may become unacceptable for some applications.

One way to mitigate this practical problem for some applications is to design the phase sampling pattern with perfect step-like phase transitions as shown in FIG. 6A to have a variation in the output amplitudes of different channels that offsets the amplitude variation among different channels caused by the gradual transitions due to limitations in fabrication. Hence, for a known size of a transition width in a fabrication process, the phase transition positions and the phase values may be selected purposefully to cause the amplitudes of different channels (e.g., by setting the channel amplitude coefficients $\alpha_m$) to increase with the absolute value of M so that the amplitude variation caused by fabrication limitations can be reduced or substantially compensated.

This pre-compensation during the design process is illustrated in FIGS. 12A–12F. The phase sampling function 1210A is designed to produce an output amplitude variation 1210B which increases with the absolute value of the channel number M. A phase change in this design is a perfect step change (with zero transition width). For example, at a transition position 1200, the phase changes from "−1" to "+1". In an actual phase sampling grating, the width of the transition region from the "−1" to "+1" is not zero, e.g., 1201 or 1202 as shown in simulated actual phase sampling patterns 1220A and 1230A, respectively. The output amplitude patterns 1220B and 1230B are specifically designed to compensate for the variations caused by the nonzero transition widths shown in sampling patterns 1220A and 1230A, respectively. The substantially compensated output channels are shown by curves 1220C and 1230C.

Alternatively, variation in channel amplitudes may be desirable in some other applications. Hence, the gradual phase transition regions between adjacent phase segments of different phase values may be specially designed to achieve certain amplitude variation in different channels.

3.2. Phase Sampling Coupled with Assisting Amplitude Sampling

The above pure phase sampling may be designed to reduce the out-of-band signals and hence to improve the optical efficiency of such sampled gratings. However, it can be difficult to substantially eliminate such undesired signals in pure phase sampling patterns. See, for example, the out-of-band signals shown in FIGS. 7–12. The phase sampling with discrete phase segments of equal lengths also produces output channels with an undesired sinc amplitude envelope. It is discovered that these shortcomings of the pure phase sampling may be overcome by introducing a moderate amplitude sampling pattern in addition to a phase sampling pattern. Such an amplitude sampling pattern provides an additional amplitude modulation over the amplitude modulation of the underlying grating structure while maintaining the contiguous presence of the amplitude modulation of the underlying grating structure. That is, the moderate amplitude sampling, unlike some amplitude sampling techniques, can be designed to minimize any voids and reductions in the amplitude modulation of the underling grating structure.

The 'sinc' amplitude sampling function has been shown to be effective in suppressing the out-of-band response and producing a flat amplitude response over the desired channels. See, Ibsen et al., "Sinc-sampled fiber Bragg gratings for identical multiple wavelength operation," IEEE Photonics Technology Letters, Vol. 10, No. 6, pp. 842–844 (June, 1998) and international patent WO99/22255. However, for the generation of a large number of channels, the majority portions of such a grating have low amplitude. Thus, although the amplitude response can be uniform over the desired channels, the total optical efficiency of the grating is low due to presence of the low amplitude regions produced by the sinc modulation. One way to increase the optical efficiency is to increase the amplitude modulation of the refractive index in forming the underlying grating structure. However, the extent to which the refractive index of the fiber core can be modulated is generally limited by the material limitations.

Figure 13:
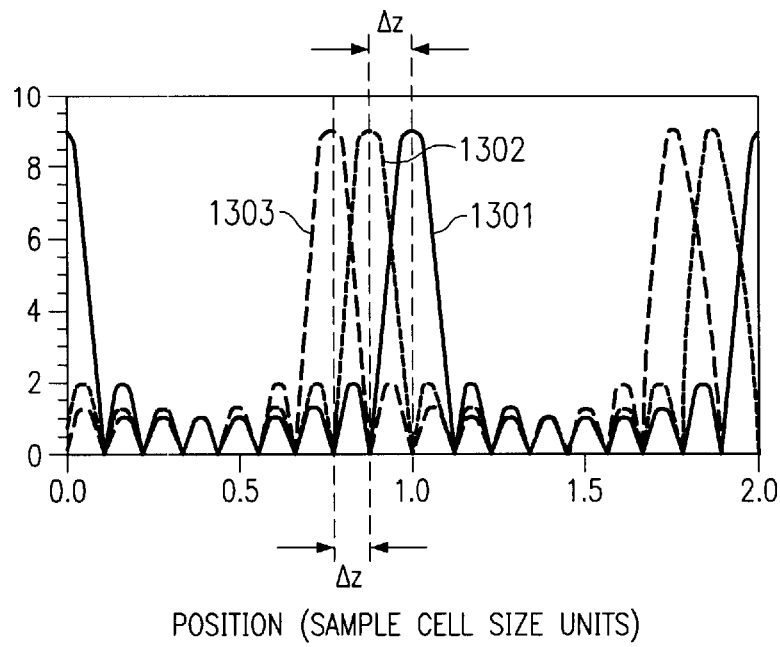
FIG. 13 shows one example of using a moderate amplitude modulation of spatially-overlapped sinc sampling functions in combination with a phase modulation to achieve substantially uniform responses from different frequency channels.

One aspect of the present disclosure is to combine the sinc amplitude modulation and the phase sampling shown in FIGS. 3, 4, and 5 to increase the utilization of the fiber while maintaining the amplitude uniformity over the desired channels. For example, the rect function in Equation (7B) in each phase segment may be replaced by a sinc amplitude sampling function with a width $\Delta z_{sinc}$:

$$S(z) = \text{sinc}\left(\frac{z}{\Delta z_{\text{sinc}}}\right) \otimes \sum_{j,k} \exp[i\phi_{n_s j+k}] \cdot \quad (24)$$
$$\text{comb}[(z - (n_s j + k)\Delta z)/P],$$

where $\Delta z = P/N$ is the interval between adjacent sinc functions, each with a different phase $\psi_{n_s j+k}$ given, for example, by Eq. (7A), and the sum extends over the entire grating length. The sinc amplitude function width $\Delta z_{\text{sinc}}$ may be approximately equal to the interval $\Delta z$ so that the adjacent sinc amplitude functions overlap and the total effective amplitude sampling pattern does not vary in amplitude as much as a single sinc sampling pattern. FIG. 13 illustrates such spatial overlap of adjacent sinc sampling functions 1301, 1302, 1303 in the above phase sampling scheme. Since each sinc pattern is shifted by a distance $\Delta z$, such that its maximum coincides with the minimum of the adjacent since pattern, the sum of the patterns has much reduced total amplitude variation.

The phase values $\psi_{n_s j+k}$ for different phase segments, e.g., those defined by Eq. (7A), can be selected to produce a Fourier transform of the above sampling pattern in the following form:

$$|F\{S(z)\}| = \text{rect}\left(\frac{f}{f_{s_2}}\right) \cdot \text{comb}\left(\frac{f}{f_s}\right), \quad (25)$$

where $f_{s2} = c/(2n_{avg} \cdot \Delta z_{sinc}) \approx 100$ GHz/$\Delta z_{sinc}$(mm), and $f_s = c/(2Nn_{avg} \cdot \Delta z) \approx 100$ GHz/P(mm). Hence, with a moderate amplitude modulation, the phase sampling technique shown in FIG. 6A can be used to produce a substantially uniform amplitude response for different frequency channels.

Another technique for obtaining contiguous phase sampling pattern coupled with an assisting amplitude sampling pattern is to interleave $n_s$ different phase-shifted groups of frequency channels of substantially the same amplitude with each group having $n_s$ equally-spaced frequency channels with a frequency spacing of by $n_s f_0$. Hence, the spectral response of each group of frequency channels can be represented by:

$$\tilde{S}_k(f) = \sum_j \delta(f - f_0(n_s j + k))\exp(i\phi_{jk}), \quad (26)$$

where k denotes the group k, j represents different frequency channels within the group k, j and k vary from $-(n_s-1)/2$ to $(n_s-1)/2$, and $\phi_{jk}$ represents a phase associated with different channels within the group k. If $\phi_{jk}$ is a constant for all different channels of each group, the corresponding spatial sampling pattern of this frequency response is a sinc sampling in the fiber, with a period of $P/n_s$:

$$S_k(z) = \sum_j \exp(i2\pi z j n_s / P) \quad (27)$$
$$= \sin(n_s^2 \pi z/P)/n_s \sin(n_s \pi z/P).$$

Figure 14A:
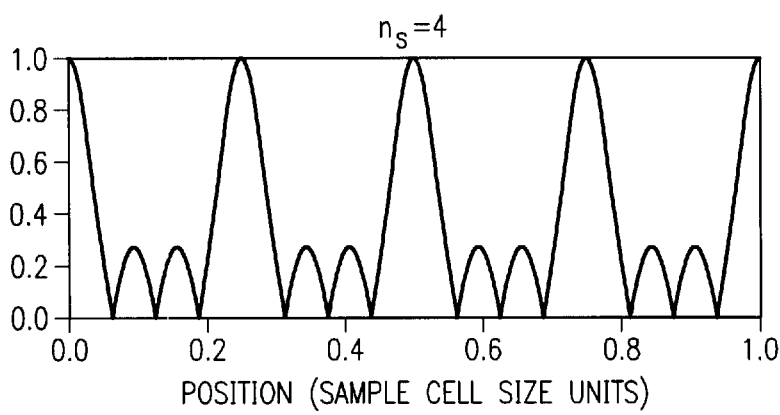
FIGS. 14A and 14B respectively show a sinc spatial modulation pattern and a corresponding spectral response in the frequency domain without interleaving phase-shifted channels.
Figure 14B:
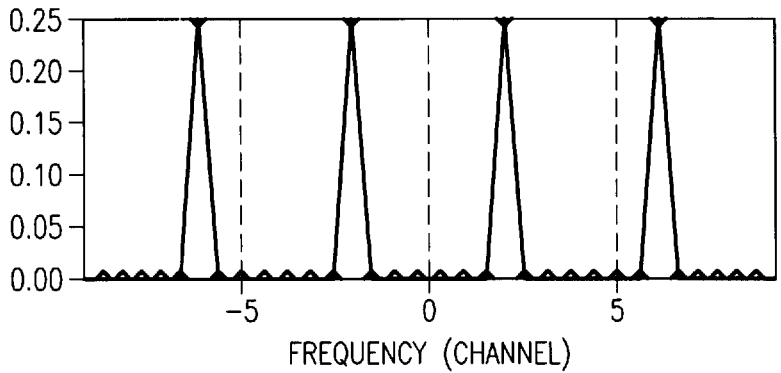

FIGS. 14A and 14B respectively show the spatial sampling pattern and spectral pattern for $n_s = 4$.

Notably, the nulls of the sinc pattern in FIG. 13A occur at a distance of $z = MP/n_s^2$ (M=1, 2, 3, . . . ) away from the central peak. To obtain a continuous index grating in the fiber without voids, a number of $(n_s-1)$ sets of substantially identical spatial sine patterns can be spatially shifted by $\Delta z = P/n_s^2$ relative to one another and added to fill the voids of the nulls. In the frequency domain, this spatial interleaving of sinc patterns corresponds to spectral interleaving of $n_s$ groups of frequency channels with a linear relative phase shift for the jth channel of kth group:

$$\phi_{jk} = (2\pi/n_s)(j-j_0)(k-k_0) + \phi_{arb}(k), \quad (28)$$

where both k and j vary from $-(n_s-1)/2$ to $(n_s-1)/2$, and $j_0$, $k_0$, and $\phi_{arb}(k)$ are arbitrary. For example, with $j_0$, $k_0$, and $\phi_{arb}(k) = 0$, the spatial sampling for the kth group is, $$S_k(z) = \sum_j \exp(i2\pi z j n_s/P)\exp(i2\pi jk/n_s) \quad (29)$$
$$= \sin(n_s^2 \pi(z-k\Delta z)/P)/n_s \sin(n_s \pi(z-k\Delta z)/P).$$

Therefore, the spectral response of the entire interleaved $n_s^2$ spectral channels can be written as:

$$\tilde{S}(f) = \sum_k \tilde{S}_k(f) = \sum_{j,k} \delta(f - f_0(n_s j + k)) \cdot \exp(i\phi_{jk}), \quad (30)$$

The respective spatial sampling pattern is $$S(z) = \sum_k S_k(z) = \sum_{j,k} \exp(i2\pi z(j n_s + k)/P)\exp[i(2\pi jk/n_s)] \quad (31)$$
$$= \sum_k \sin(n_s^2 \pi(z-k\Delta z)/P)/n_s \sin(n_s \pi(z-k\Delta z)/P).$$

This spatial sampling pattern represents a uniform sum of shifted sinc sampling functions and produces a fairly uniform amplitude modulation along the fiber.

It is discovered that the phase shifts for different frequency channels expressed in Eq. (28) may be better suited for cases where $n_s$ is an even number if $j_0$, $k_0$, and $\phi_{arb}(k)$ are all zero. If $n_s$ is an odd number, a sampling function with a somewhat lower level of amplitude modulation can be obtained when a different set of the arbitrary constants are used:

$$\phi_{jk} = 2\pi(jk/n_s + j/2). \quad (32)$$

Thus, the general sampling function can be written as:

$$S(z) = \sum_{j,k=-\frac{n_s-1}{2}}^{\frac{n_s-1}{2}} \exp(i2\pi z(j n_s + k)/P + i\phi_{jk}) \quad (33)$$

where and $$\phi_{jk} = \frac{2\pi}{n_s}(j-j_0)(k-k_0) + \phi_{arb}(k)$$

if $n_S$ is even and
$\phi_{jk} = (2\pi/n_s)(j-j_0)(k-k_0) + (2\pi/n_s)(j-j_0)/2 + \phi_{arb}(k)$ if $n_s$ is odd, where $j_0$, $k_0$, and $\psi_{arb}(k)$ are constants. In addition, Eq. (33) can be modified to generate an arbitrary set of channel output amplitudes $\alpha_{jk}$, $$S(z) = \sum_{j,k=-\frac{n_s-1}{2}}^{\frac{n_s-1}{2}} \alpha_{jk} \exp(i2\pi z(jn_s+k)/P + i\phi_{jk}) \quad (34)$$

where $\phi_{jk}$ may be taken from Eq. (33) or more generally from Eq. (28). In this way, it is possible to obtain any desired spectral envelope, including but not limited to the absence of one or more channels within a given frequency band.

Figure 15A:
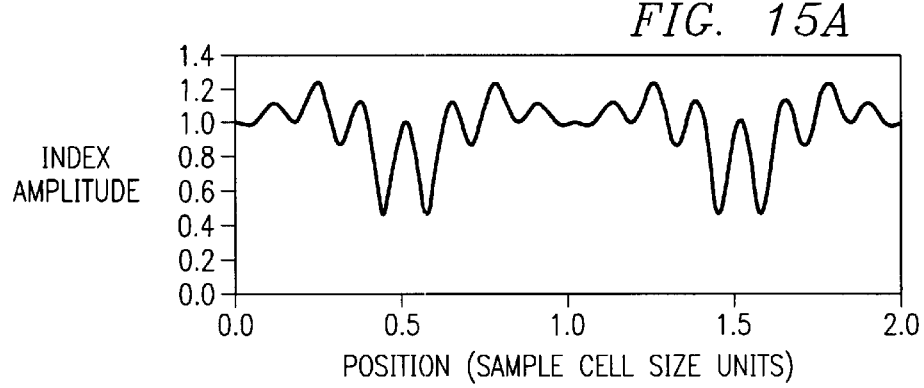
FIGS. 15A–15D show computed responses of an exemplary spatial sampling pattern that has interleaved, phase-shifted frequency channels in the frequency domain.
Figure 15B:
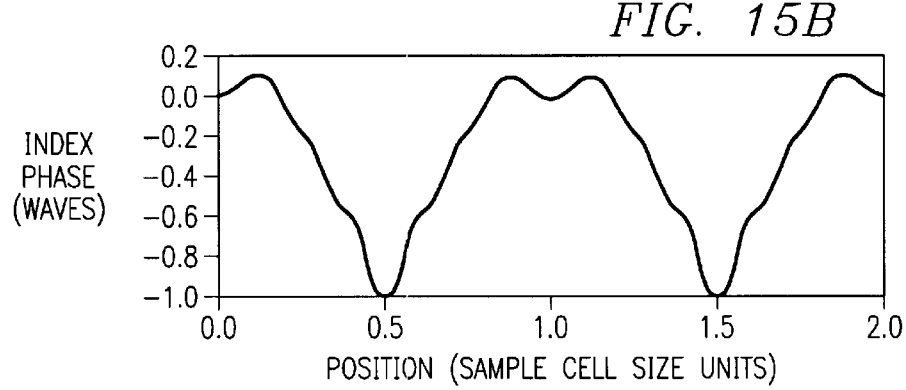
Figure 15C:
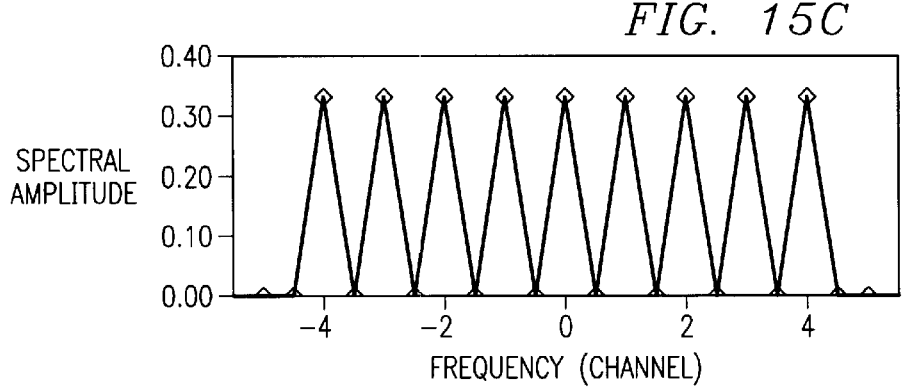
Figure 15D:
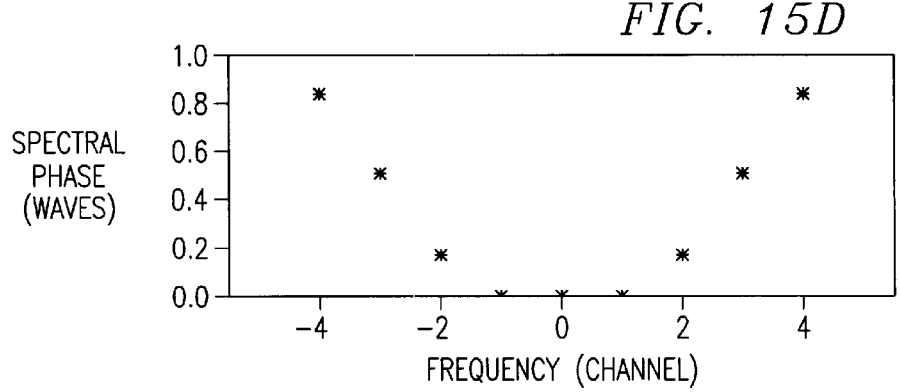

FIGS. 15A and 15B show an example of the amplitude sampling pattern and the phase sampling pattern, respectively, as a function of position z along the fiber for $n_s=3$. FIGS. 15C and 15D show the amplitudes and phase values of the 9 spectral channels in the frequency domain, respectively. Notably, the amplitude variation of the sampling pattern shown in FIG. 15A is contiguous and does not have nulls. Hence, this amplitude modulation can provide a contiguous presence of the underlying grating structure throughout the fiber for efficient filtering. Different from previous phase samplings with discrete phase segments, the phase change in the spatial domain is essentially continuous along the fiber as illustrated in FIG. 15B.

The sampling pattern of Eq. (33) is generally not a pure phase sampling pattern but includes a moderate amplitude modulation without voids in comparison with various conventional sinc sampling techniques. The ease of fabrication of a sampled grating based on such a sampling pattern can be improved if the magnitude of the moderate amplitude modulation can be further reduced.

One technique to reduce the amplitude modulation in the sampling is to perform an iterative Fourier transform process to modify the amplitude modulation one step at a time without changing the associated phase values associated with the sampling pattern in Eq. (33). In one embodiment, the relevant Fourier transform is the envelope of the channel response. The iteration is performed to make the resultant spatial amplitude modulation of the underlying grating substantially uniform.

Figure 16:
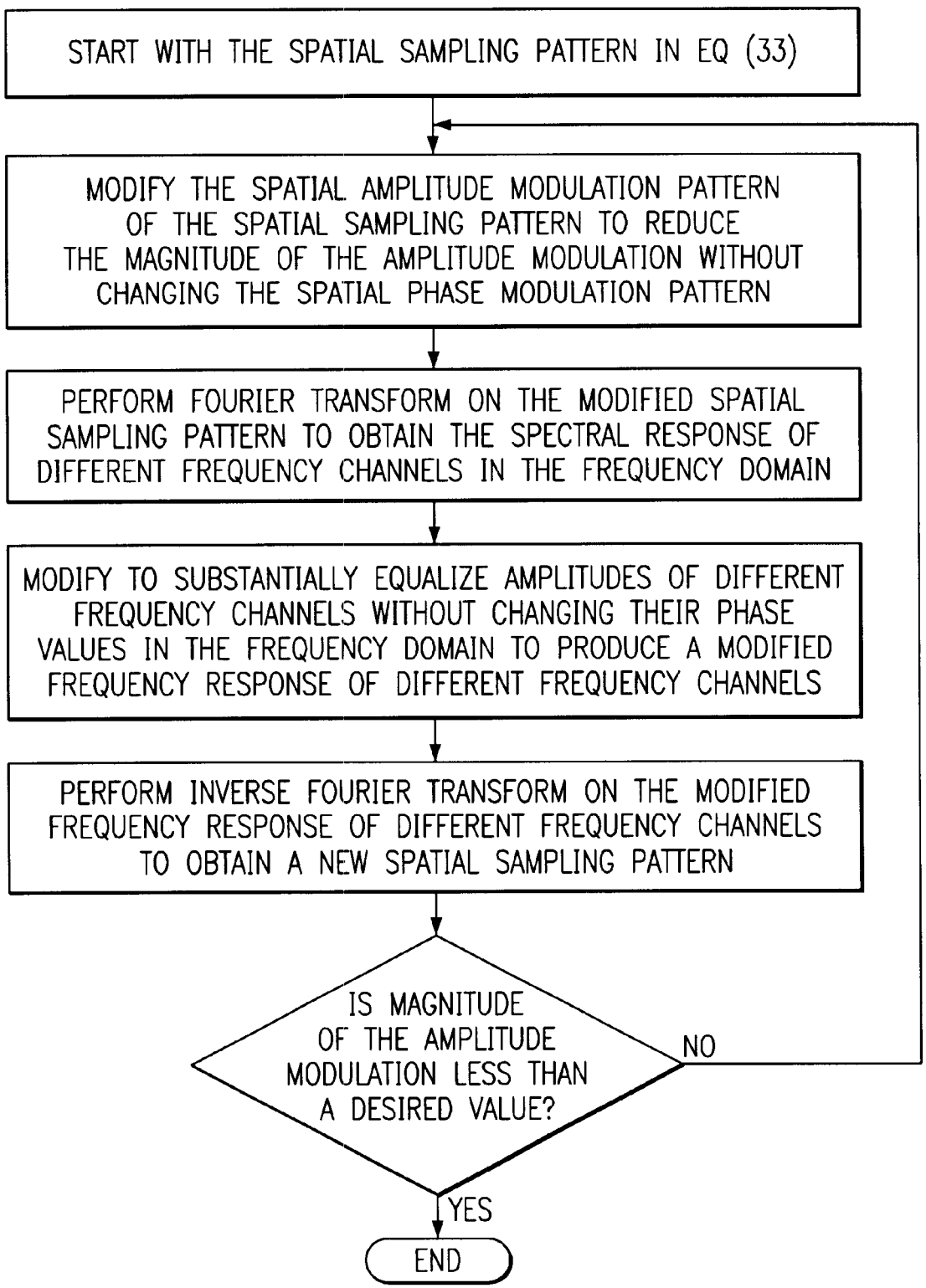
FIG. 16 shows an exemplary iteration process in designing a phase sampling pattern with a reduced amplitude modulation in the space domain.

FIG. 16 shows a flowchart of the iteration process in designing the sampling pattern. First, the amplitude of the spatial sampling function S(z) from, for example, Equation (33), which has both amplitude and phase modulations, is modified in a selected manner to reduce the amount of the amplitude modulation while its phase modulation pattern remains unchanged. This produces a modified spatial sampling function $S^{(1)}(z)$. A Fourier transform of the sampling function $S^{(1)}(z)$ is performed to obtain the spectral response $F^{(1)}(f)$ of N frequency channels. The amplitudes of these frequency channels are no longer uniform in the desired band due to the modification in the amplitude sampling pattern. Next, without changing the phase values of different frequency channels, amplitudes of different frequency channels are modified to be uniform in the desired band so that a modified spectral response $F'^{(1)}(f)$ is obtained. In the spectral region outside the signal spectral range, the amplitudes of the out-of-band signals can either be left unmodified, or be set equal to zero during the design phase. Subsequently, an inverse Fourier transform is performed on $F'^{(1)}(f)$ to obtain a new spatial sampling function response $S^{(2)}(z)$. The Gerchberg-Saxton iteration algorithm may be used to perform the above process. See, e.g., Dixit et al, Optics Letters, Vol. 21, p.1715–1717 (1996), and Gerchberg and Saxton, Optik, Vol. 35, p.237 (1972). The above process is repeated until the amplitude variation of the sampling function $S^{(m)}(z)$ is reduced within an acceptable range, where m is the number of iterations performed.

It should be noted that one can also use the above iteration to generate a spectral channel envelope which is arbitrarily nonuniform. At the point in the above algorithm where the spectral response is modified to become uniform, instead one modifies it according to a desired spectral amplitude envelope. It may be advantageous to start with an initial phase and amplitude modulated sampling function derived, for example, from Eq. (34), which gives the desired amplitude envelope of the spectral channels.

Figure 17A:
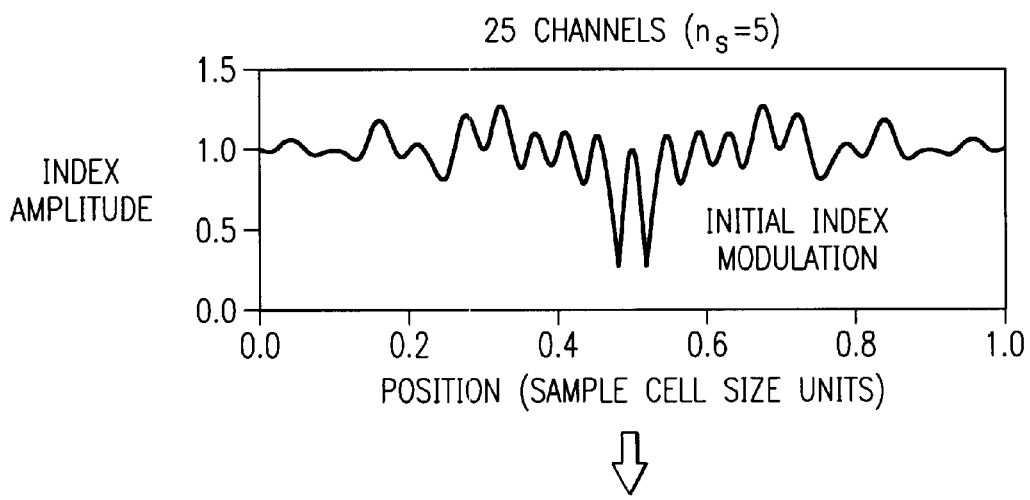
FIGS. 17A, 17B, 17C, 17D, and 17E show computed responses of an exemplary phase sampling pattern that is designed based on the process shown in FIG. 16.
Figure 17B:
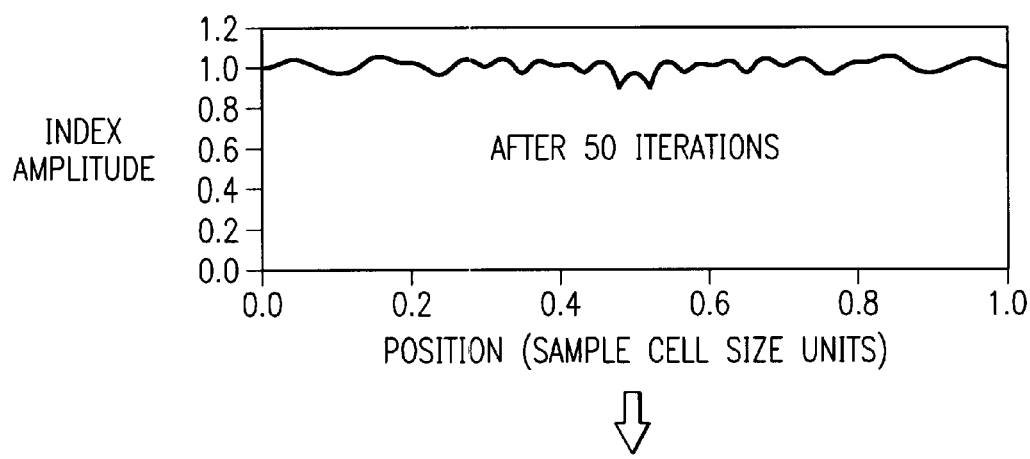

FIG. 17B shows one exemplary amplitude modulation after the above iteration process for the above example of $n_s=3$, where the out-of-band amplitudes are not modified. The phase of this modified sampling function remains the same as shown in FIG. 17A. However, the amplitude variation is substantially reduced from the original amplitude modulation shown in FIG. 17A. In principle, a sufficiently large number of iterations may be used to reduce the amplitude modulation so that an effectively pure phase sampling pattern can be achieved (FIGS. 17C and 17D).

Figure 17C:
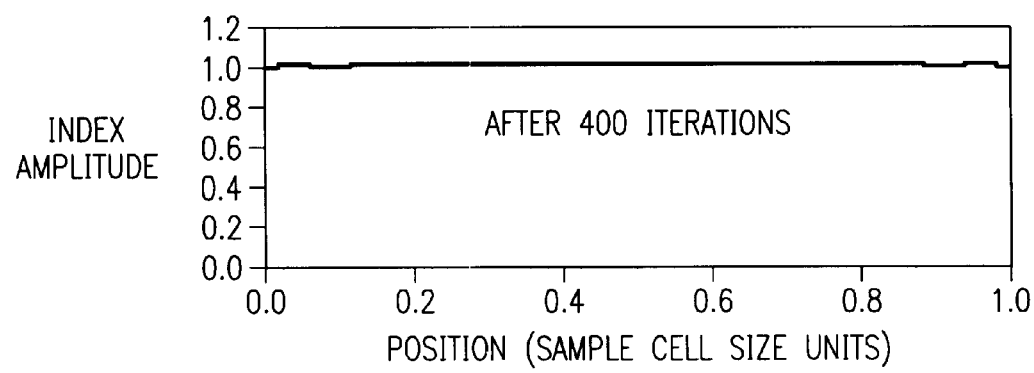
Figure 17D:
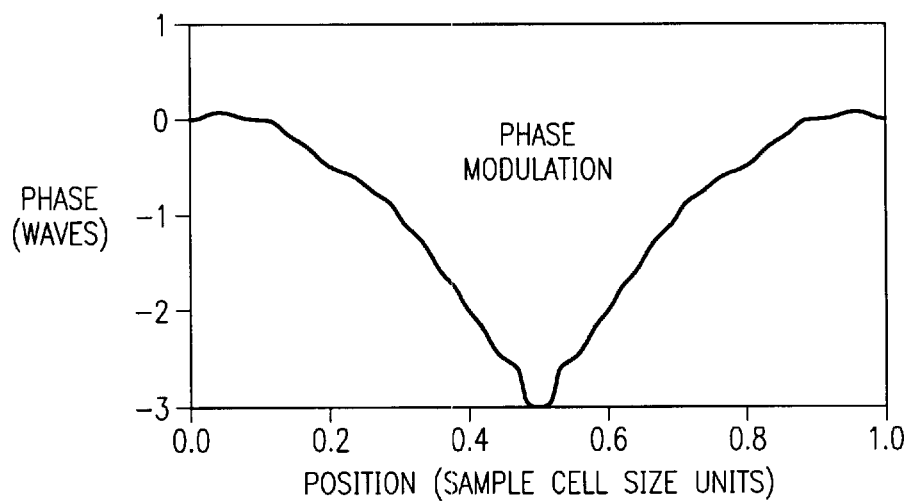
Figure 17E:
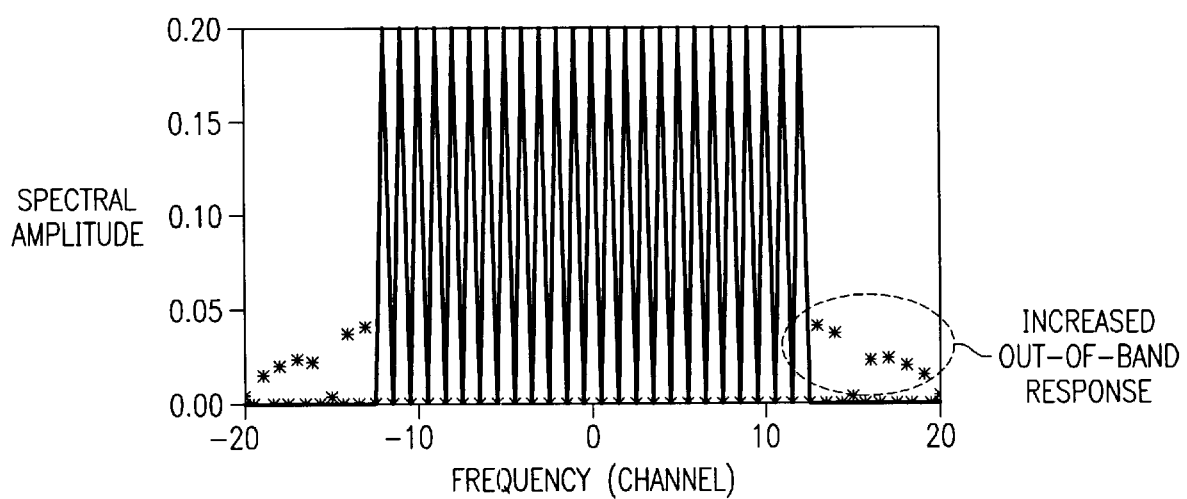

FIG. 17E further shows the spectral response in the frequency domain of the modified sampling pattern have an amplitude modulation of FIG. 17C and a phase modulation of FIG. 17D. The frequency channels in the desired band are shown to be substantially uniform. However, the modified amplitude sampling generates out-of-band signal channels on both sides of the desired band, while the out-of-band signals in FIG. 15C are essentially negligible by using the amplitude modulation shown in FIG. 15A. Hence, a sampling pattern as shown in FIGS. 17B and 17C may be used to achieve an essentially pure phase sampling when uniform channel amplitudes are desired. The sampling pattern as in FIGS. 15A and 15B may be used when suppressing out-of-band signals is desired.

Figure 18A:
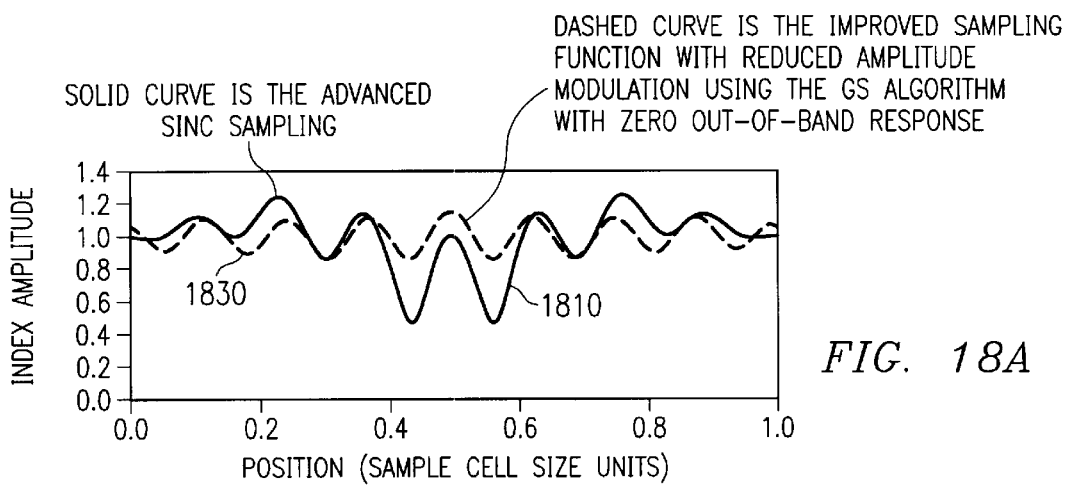
FIGS. 18A–18C further show calculated results based on the process in FIG. 16 to substantially eliminate signals outside a desired signal band.
Figure 18B:
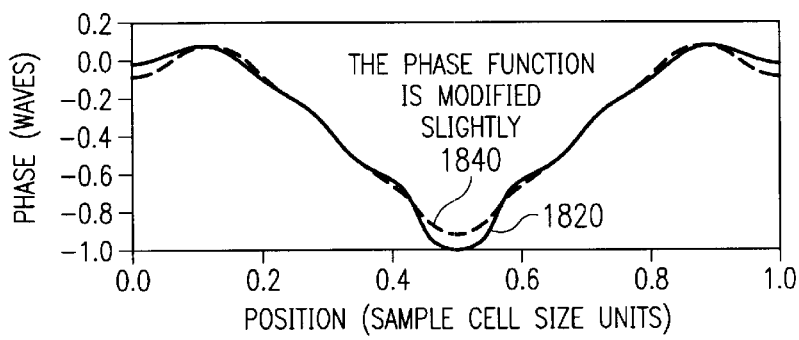
Figure 18C:
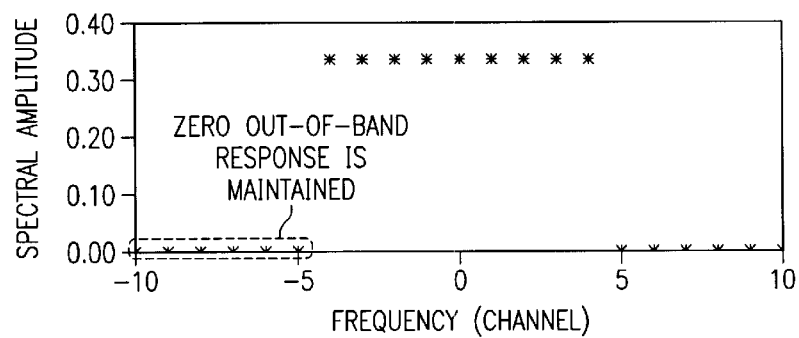

In the situation where the out-of-band amplitudes are set to zero, the amplitude modulation of the sampling function can be reduced somewhat although not eliminated. An example of this technique is shown in FIGS. 18A–18C where the initial sampling function is given by Eq. (33) for $n_s=3$. The solid curves 1810 and 1820 respectively represent the spatial amplitude and phase distributions of the sampling function prior to optimization. After iterative optimization by adjusting the amplitude and phase of the sampling function, an improved sampling function is produced. The dashed curves 1830 and 1840 represent the modified amplitude and phase distribution, respectively. The amplitude variation of the improved sampling function is reduced compared to the initial sampling function. A sampling pattern may also compromise amplitude modulation of the sampling function, uniform channel amplitudes, and suppression of the out-of-band signals to meet application requirements.

It is further contemplated that the simulated thermal annealing algorithm illustrated in FIG. 6B may be used to adjust the relative phase values of the N equally spaced channels in the frequency domain to reduce or minimize the amount of amplitude modulation of the index grating within the waveguide. This approach is useful because in WDM applications the relative phase of one channel to another is generally not relevant to the device performance and therefore the phase adjustment usually does not alter the optimized values of other device parameters.

The N-channel spectral response of the sampling function may be expressed in the following general form, $$\tilde{S}(f) = \sum_{j=0}^{N-1} \delta(f - jf_0) \cdot \exp(i\theta_j) \quad (35)$$

where $\theta_j$ is the phase of the $j^{th}$ frequency channel in the frequency domain. Hence, the sampling function of the index grating in the fiber is given by $$S(z) = \sum_{j=0}^{N-1} \exp(i2\pi z j / P)\exp(i\theta_j) \quad (36)$$

To minimize the amplitude modulation in S(z), a similar process shown in FIG. 6B may be used, where the merit function is defined by the amount of amplitude modulation, for example, $$f(z) = \int_0^P (S(z) - \bar{S})^2 dz \quad (37)$$

where $\bar{S} = \int_0^P S(z)dz/P$ is the average value of the sampling function S integrated over the sampling cell period P, and the variables, which are adjusted by the thermal annealing process, are the phases of the frequency channels $\theta_j$, for j=0 to N−1 (instead of the grating phase transition points $z_j$). Through the annealing algorithm the merit function f(z) is minimized and thus a sampling function S(z) with minimal amplitude modulation is generated. By definition of Eq. (35), the spectral response will include only N channels of equal amplitude, and thus will have zero response at frequencies out of the selected signal bandwidth.

Other forms of the merit function f(z) may be used to achieve other design goals. For example, it may be desirable to minimize the amplitude modulation of S(z) and to maximize the diffraction efficiency of the underlying grating structure. The Fourier Transform of the intensity of S(z) can be written as $A(2\pi f) = \Im\{|S(z)|^2\}$. If the nonzero frequency content is to be minimized, the merit function f(z) may be defined as the sum of the intensity of the nonzero frequency components $$f(z) = \sum_{j \neq 0} |A(2\pi j/P)|^2 \quad (38)$$

Through the annealing algorithm the merit function f(z) can be minimized and thus a sampling function S(z) with minimal amplitude modulation is generated.

The amplitude modulation of the sampling function may be further reduced by subsequently applying the iterative Fourier technique illustrated in FIG. 16. In this case, if the out of band response is not required to be zero, the amplitude modulation in S(z) may be essentially eliminated, as shown in the examples of FIGS. 17A–17D.

Figure 19A:
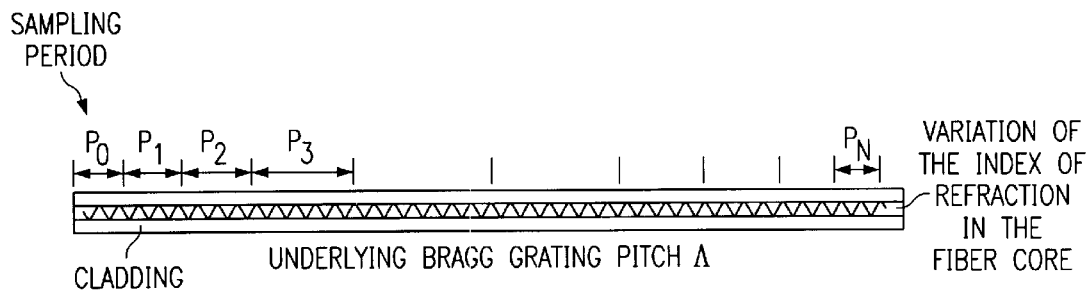
FIGS. 19A–19C illustrate varying sampling periods that change spatially along the length of the fiber.
Figure 19B:
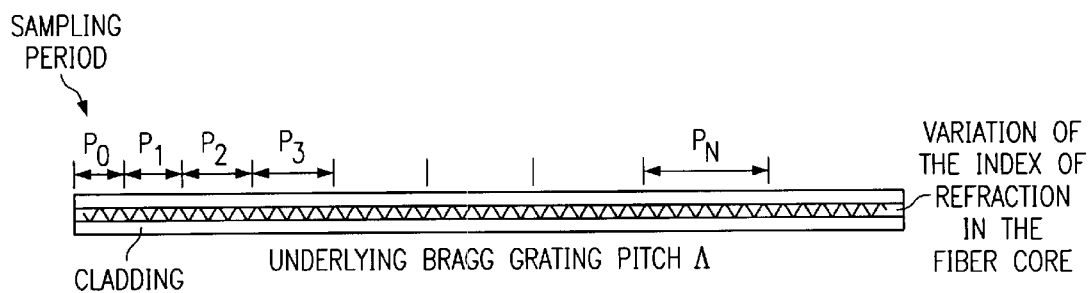
Figure 19C:
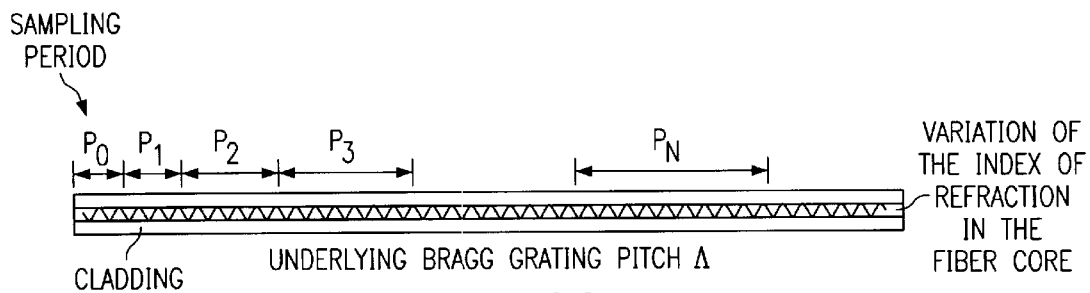

The sampling period P in the above description is assumed to be a constant. Hence, the base sampling function $S_b(z)$ repeats over the entire grating length with exactly the same period P, and the dispersion profiles and other properties in the multiple channels caused by the spatial sampling can be made essentially identical. However, in certain applications, it may be desirable to have a varying P that changes spatially along the length of the fiber as illustrated in FIGS. 19A–19C, so that the dispersion and other channel properties may vary from one channel to another. In particular, the sampling period P may be chirped along the fiber linearly such as $P(z) = P_0 + P_1 z$ illustrated in FIG. 19B, or nonlinearly such as $P(z) = p_0 + p_1 z + p_2 z^2 + \ldots$ illustrated in FIG. 19C. Accordingly, the basic sampling pattern should also scale with P(z) as a function of z. The basic sampling types include the spatially discrete phase sampling functions described in Section 3.1 such as examples shown in FIGS. 3 and 6A, and the spatially continuous phase sampling coupled with amplitude sampling described in Section 3.2.

More generally, the base sampling function $S_b^j(z)$ may be adjusted to fit into segments of varying sampling period $P(z_j)$ centered at different positions $z_j$, $$z_j - P(z_j)/2 \leq z \leq z_j + P(z_j)/2,$$

where j=0,1,2, . . . illustrated in FIG. 19A. For the $j^{th}$ sampling interval, the base sampling function may be scaled to fit into an interval of length $P(z_j)$, $S_b^j(z) = S_b[(z-z_j)P_0/P(z_j)]$, where $P_0$ is the average sampling period over the entire grating length. Such a variation of sampling period may be used to cause a variation of the individual dispersive and amplitude characteristics from one channel to the next.

The above description only discloses a few embodiments. Other modifications and enhancements may be made. All these are intended to be encompassed by the following claims.

What is claimed is:

1. A device, comprising:
   a wave-guiding conduit configured to transport optical energy along an optic axis;
   a grating structure, formed in said wave-guiding conduit and operable to vary spatially with a grating period along said optic axis, to reflect an optical spectral component in said optical energy that satisfies a Bragg phase-matching condition with said grating structure; and
   a sampling structure formed in said wave-guiding conduit and overlapping said grating structure to include a phase sampling pattern with a sampling period greater than said grating period, each period of said phase sampling pattern including a plurality of contiguous, discrete spatial phase segments along said optic axis within each of which said grating structure does not change a phase, wherein said grating structure changes a phase between at least two adjacent phase segments.

2. The device as in claim 1, wherein said grating structure includes a spatial modulation of a refractive index with said grating period in said wave-guiding conduit and said phase sampling pattern does not change an amplitude of said refractive index spatial modulation.

3. The device as in claim 1, wherein lengths of said spatial phase segments along said optic axis are substantially equal to one another.

4. The device as in claim 3, wherein phase values of said phase segments are selected to produce a plurality of reflected spectral channels that are uniformly spaced from one another.

5. The device as in claim 4, wherein a total number of spatial phase segments in each sampling period is N, and a phase value of each spatial phase segment is given by $$\phi_{jn_s+k} = \frac{2\pi}{n_s}(j-j_0)(k-k_0) + \phi_{arb}(k),$$

wherein $n_s^2 = N$, j and k are respectively given by 0, 1, 2, . . . , ($n_s$−1), and $j_0$, $k_0$, and $\phi_{arb}(k)$ are constants.

6. The device as in claim 3, wherein phase values of said phase segments are selected to produce a plurality of spectral reflected channels that are not spaced uniformly from one another.

7. The device as in claim 1, wherein a phase of said grating structure changes by 180 degrees from at least one spatial phase segment to an immediate adjacent spatial phase segment.

8. The device as in claim 1, wherein said spatial phase segments have different lengths along said optic axis.

9. The device as in claim 8, wherein a phase change in said grating structure from one spatial phase segment to an immediately adjacent spatial phase segment is either zero or 180 degrees.

10. The device as in claim 8, further including a phase transition region between two adjacent phase segments with different phase values, wherein said phase sampling pattern gradually changes a phase value in said phase transition region from one phase value to another phase value.

11. The device as in claim 10, wherein said phase transition region is designed to produce a variation in amplitudes of a plurality of spectral reflected channels produced by said sampling structure.

12. The device as in claim 1, wherein said wave-guiding conduit includes a fiber or a waveguide formed on a substrate.

13. The device as in claim 1, wherein said grating period of said grating structure changes with position along said grating structure.

14. The device as in claim 13, wherein a change in said grating period along said grating structure is nonlinear.

15. The device as in claim 1, wherein said sampling period changes with position along said grating structure.

16. A device, comprising:
a wave-guiding conduit configured to transport optical energy along an optic axis;
a grating structure formed in said wave-guiding conduit and operable to vary spatially with a grating period along said optic axis to reflect an optical spectral component in said optical energy that satisfies a Bragg phase-matching condition; and
a spatial sampling structure formed in said wave-guiding conduit superimposed on said grating structure and including a phase sampling pattern that continuously changes a phase of said grating structure along said optic axis with a sampling period greater than said grating period, wherein a Fourier transform of said spatial sampling structure in a frequency domain includes a plurality of spaced spectral channels with discrete phase values in said frequency domain, and wherein at least two frequency channels have different phase values.

17. The device as in claim 16, wherein said spatial sampling structure includes a spatial amplitude sampling pattern that continuously changes an amplitude of said grating structure along said optical axis with said sampling period without creating an area in said wave-guiding conduit that is substantially free of said grating structure.

18. The device as in claim 16, wherein the number of said frequency channels in said plurality is N and said spatial sampling structure is given by $$S(z) = \sum_{j,k=-\frac{n_s-1}{2}}^{\frac{n_s-1}{2}} \alpha_{jk} \exp(i 2\pi z (j n_s + k)/P + i\phi_{jk}) \quad (34)$$

where z is a spatial position along said optic axis, P is said sampling period, $\alpha_{jk}$ is an amplitude coefficient, $n_s^2=N$, and $$\phi_{jk} = \frac{2\pi}{n_s}(j-j_0)(k-k_0) + \phi_{arb}(k)$$

if $n_s$ is even and $\phi_{jk}=(2\pi/n_s)(j-j_0)(k-k_0)+(2\pi/n_s)(j-j_0)/2+\phi_{arb}(k)$ if $n_s$ is odd, where $j_0$, $k_0$, and $\psi_{arb}(k)$ are constants.

19. A device, comprising:
a wave-guiding conduit along an optic axis and configured to transport optical energy along said optic axis, said wave-guiding conduit having a grating segment in which a grating is formed by a spatial amplitude modulation of a refractive index at a grating period in said grating segment along said optic axis, said grating operable to reflect an optical spectral component that satisfies a Bragg phase-matching condition;
a plurality of spatial sampling patterns formed in said grating segment to modify said grating, each spatial sampling pattern having repetitive spaced modulation segments with lengths less than a common sampling period and greater than said grating period to modulate both phase and amplitude of said grating if present in said grating segment alone, wherein said modulation segments in each spatial phase sampling pattern respectively uniformly shift a phase of said spatial amplitude modulation of said refractive index by phase values according to respective phase distributions; and
wherein said spatial sampling patterns are spatially interleaved in said grating segment along said optic axis to form a contiguous periodic spatial sampling pattern in said sampling period that does not modulate an amplitude of said spatial amplitude modulation of said refractive index, each period of said contiguous periodic spatial pattern formed of modulation segments from said spatial sampling patterns that are contiguously positioned relative to one another and are substantially free of gaps therebetween.

20. The device as in claim 19, wherein said modulation segments from different spatial sampling patterns have a common length.

21. The device as in claim 20, further comprising a sinc amplitude sampling pattern formed in each modulation segment to have a sinc width that is substantially equal to said length of each modulation segment.

22. The device as in claim 19, wherein said grating period of said grating is chirped with position along said optic axis.

23. The device as in claim 19, wherein said common sampling period of each of said interleaved spatial sampling patterns is chirped along said optic axis.

24. The device as in claim 19, wherein said phase distributions are selected to produce uniformly spaced spectral channels.

25. The device as in claim 19, wherein said phase distributions are selected to produce non-uniformly spaced spectral channels.

26. A method, comprising the steps of:
providing a spatial sampling pattern that continuously changes both a phase and an amplitude of an index amplitude modulation of a underlying grating structure with a grating period less than a sampling period, wherein a Fourier transform of said spatial sampling structure in a frequency domain includes a plurality of spaced frequency channels; and
assigning discrete phase values to said frequency channels in said frequency domain wherein at least two frequency channels have different phase values, such that said spatial sampling pattern does reduce an amplitude of said index amplitude modulation to substantially zero.

27. The method as in claim 26, further comprising the steps of repeating an iteration process to reduce a spatial change to an amplitude of said index amplitude modulation caused by said spatial sampling pattern, said iteration process including:
- reducing an amount of amplitude change caused by said spatial sampling pattern to produce a modified spatial sampling pattern;
- performing a Fourier transform of said modified spatial sampling pattern to obtain a spectral response with said frequency channels;
- adjusting amplitudes of said frequency channels according to a channel amplitude distribution to produce a modified spectral response; and
- performing an inverse Fourier transform on said modified spectral response to obtain a new spatial sampling pattern.

28. The method as in claim 26, wherein the number of said frequency channels in said plurality is N and said spatial sampling pattern is given by $$S(z) = \sum_{j,k=-\frac{n_s-1}{2}}^{\frac{n_s-1}{2}} \alpha_{jk} \exp(i2\pi z(jn_s + k)/P + i\phi_{jk}) \quad (34)$$

where z is a spatial position along said optic axis, P is said sampling period, $\alpha_{jk}$ is an amplitude coefficient, $n_s^2 = N$, and $$\phi_{jk} = \frac{2\pi}{n_s}(j - j_0)(k - k_0) + \phi_{arb}(k)$$

if $n_s$ is even and $\phi_{jk} = (2\pi/n_s)(j-j_0)(k-k_0) + (2\pi/n_s)(j-j_0)/2 + \phi_{arb}(k)$ if $n_s$ is odd, where $j_0$, $k_0$, and $\psi_{arb}(k)$ are constants.

29. The method as in claim 26, wherein said grating period of said grating structure is chirped with position.

30. The method as in claim 26, wherein said sampling period of said spatial sampling pattern is chirped with position.

31. A method, comprising the steps of:
- providing a periodic spatial sampling pattern to have contiguous, discrete phase segments of different segment lengths with varying phase values;
- superimposing said sampling pattern over an index amplitude modulation of an underlying grating structure with a grating period less than a sampling period of said sampling pattern to change a phase of said index amplitude modulation between two adjacent said phase segments of different phase values and to maintain a phase of said index amplitude modulation within each said phase segment; and
- selecting said segment lengths and said phase values of said phase segments such that a Fourier transform in a frequency domain of said sampling pattern and said underlying grating structure includes a plurality of spaced frequency channels at desired spectral spacings and amplitude distribution.

32. The method as in claim 31, wherein said different segment lengths and said varying phase values of said phase segments are selected by the steps of:
- a. using a set of initial values for said phase values and said segment lengths to compute a first value of an error function;
- b. modifying said initial values to produce a modified set of values for said phase values and said segment lengths according to a selected distribution;
- c. computing a second value of the said error function based on said modified set of values;
- d. computing a probability function based on a difference between said first and said second of said error function values, wherein a probability value of said probability function is dependent on a parameter;
- e. selecting a new set of values for said phase values and said segment lengths according to said probability value at a first parameter value of said parameter;
- f. changing said first parameter value to a new parameter value to produce a modified new set of values with a different probability value;
- g. using said modified new set of values to compute a third value of said error function;
- h. using said modified new set of values to determine said sampling pattern, if said third value of said error function is less than an acceptable value; and
- i. using said modified new set of values as a new set of initial values to repeat steps a. through h. if said third value of said error function is greater than said acceptable value.

33. The method as in claim 32, wherein said selected distribution is a random distribution.

34. The method as in claim 32, wherein said probability function includes a factor $\exp(-\Delta f/T)$, where T is said parameter, and $\Delta f$ is the difference between said first and said second values of the error function.

35. The method as in claim 31, further comprising the steps of providing a phase transition region between two adjacent said phase segments of different phase values, in which a phase of said index amplitude modulation of said underlying grating structure changes gradually.

36. The method as in claim 31, wherein said frequency channels are not equally spaced.

37. The method as in claim 31, wherein said frequency channels are substantially equally spaced.

38. The method as in claim 31, wherein said frequency channels have substantially uniform channel amplitudes.

39. A method for designing a sampled Bragg grating, said method comprising the steps of:
- providing a spatial sampling pattern that modulates at least a phase of an index amplitude modulation of an underlying Bragg grating structure for a wave-guiding element, said spatial sampling pattern having a sampling period greater than a grating period of said underlying Bragg grating structure, such that said spatial sampling pattern and said underlying Bragg grating structure in combination produce discrete reflected Bragg channels in the frequency domain; and
- selecting phase values of said discrete reflected Bragg channels in the frequency domain to reduce said index amplitude modulation of said underlying Bragg grating structure in said spatial sampling pattern.

40. The method of claim 39, further comprising the step of selecting said phase values, such that said phase values of at least two said adjacent discrete reflected Bragg channels are different.

41. The method of claim 39, further comprising the step of selecting said phase values, such that all of said discrete reflected Bragg channels are within a selected spectral range.

42. The method of claim 39, further comprising the step of selecting said phase values, such that said discrete reflected Bragg channels include said channels within a selected spectral range that have substantially equal amplitudes.

43. The method of claim 42 wherein said discrete reflected Bragg channels outside said selected spectral range have amplitudes less than those of said channels within said selected spectral range.

44. The method of claim 39 comprising selecting said phase values such that said discrete reflected Bragg channels have desired arbitrary amplitudes.

45. The method of claim 39, further comprising the step of selecting said sampling period of said spatial sampling pattern to be a constant relative to position along said wave-guiding element.

46. The method of claim 39, further comprising the step of selecting said sampling period of said spatial sampling pattern to be a variable relative to position along said wave-guiding element.

47. The method of claim 46, wherein said sampling period is spatially chirped as a linear function of position along the wave-guiding element.

48. The method of claim 46, wherein said sampling period is spatially chirped as a nonlinear function of position along the wave-guiding element.

49. The method of claim 39 wherein the step of selecting further comprises an iterative process including the steps of:

reducing said index amplitude modulation in said spatial sampling pattern by a specified amount to produce a modified spatial sampling pattern;

obtaining a spectral response of modified discrete reflected Bragg channels in frequency by performing a Fourier transform on said modified spatial sampling pattern;

adjusting amplitudes of said modified discrete reflected Bragg channels to produce a modified spectral response; and performing an inverse Fourier transform on said modified spectral response to obtain a new spatial sampling pattern.

50. A method for designing a sampled Bragg grating, said method comprising the steps of providing a periodic spatial sampling pattern containing a plurality of contiguous, discrete phase segments having varying phase values, such that at least two of said adjacent phase segments have different phase values; and superimposing said periodic spatial sampling pattern over an underlying grating structure index amplitude modulation having a grating period less than a sampling period of said periodic spatial sampling pattern, thereby producing a change of a phase of said index amplitude modulation between said at least two said adjacent phase segments having different phase values and preserving a uniform phase of said index amplitude modulation within each of said phase segments, such that discrete Bragg reflection channels at different channel frequencies are generated.

51. The method of claim 50, further comprising the step of selecting all segment widths of said plurality of contiguous, discrete phase segments to be equal to one another.

52. The method of claim 50, further comprising the step of selecting segment widths of said plurality of contiguous, discrete phase segments, such that said segment widths of at least two adjacent phase segments are different from one another.

* * * * *